United States Patent
Utsumi et al.

(10) Patent No.: US 7,293,756 B2
(45) Date of Patent: Nov. 13, 2007

(54) ENGINE FASTENING STRUCTURE

(75) Inventors: Yoji Utsumi, Shizuoka (JP); Masahiro Ito, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 185 days.

(21) Appl. No.: 10/501,380

(22) PCT Filed: Feb. 14, 2003

(86) PCT No.: PCT/JP03/01605

§ 371 (c)(1),
(2), (4) Date: Jul. 13, 2004

(87) PCT Pub. No.: WO03/071115

PCT Pub. Date: Aug. 28, 2003

(65) Prior Publication Data

US 2005/0205751 A1    Sep. 22, 2005

(30) Foreign Application Priority Data

Feb. 20, 2002    (JP) .............................. 2002-043835

(51) Int. Cl.
F16M 3/00    (2006.01)
F16M 5/00    (2006.01)
F16M 9/00    (2006.01)
F16M 11/00   (2006.01)

(52) U.S. Cl. .................. 248/674; 248/637; 74/591; 123/192.1

(58) Field of Classification Search ............... 248/557, 248/637, 200, 674; 267/136, 141.1, 141.2, 267/141.3; 244/54; 123/196 A, 192.2, 196 P, 123/195 A; 74/591, 44, 331, 413, 603
See application file for complete search history.

(56) References Cited

U.S. PATENT DOCUMENTS

| 5,203,854 | A | * | 4/1993 | Nilsson et al. ............... 384/433 |
| 5,218,885 | A | * | 6/1993 | Nakano et al. ................ 74/591 |
| 6,036,163 | A | * | 3/2000 | Yamada ...................... 248/557 |
| 6,626,140 | B2 | * | 9/2003 | Aichinger et al. ....... 123/195 A |
| 6,648,783 | B1 | * | 11/2003 | Bogner ........................ 474/134 |
| 2005/0268877 | A1 | * | 12/2005 | Hashimoto et al. ...... 123/192.2 |
| 2006/0081211 | A1 | * | 4/2006 | Genter ..................... 123/197.3 |

FOREIGN PATENT DOCUMENTS

| JP | 57-193745 | 11/1982 |
| JP | 3-13449 | 2/1991 |
| JP | 03-013449 U | 2/1991 |
| JP | 03-292411 | 12/1991 |
| JP | 08-021299 | 1/1996 |
| JP | 2000-234563 | 8/2000 |
| JP | 2001-082248 | 3/2001 |
| JP | 2001-347843 | 12/2001 |

* cited by examiner

Primary Examiner—Amy J. Sterling
(74) Attorney, Agent, or Firm—Hogan & Hartson LLP

(57) ABSTRACT

An engine fastening structure in which a crankcase and a cylinder body are provided as separate units, so that the crankcase and the cylinder body are connected together with connecting bolts, characterized in that the crankcase 2 is constructed in such a manner that an iron alloy bearing member 12b for supporting a crankshaft bearing is insert cast in an aluminum alloy, and in that connecting boss portions 12c are integrally formed on both sides of the iron alloy bearing member 12b which are situated opposite across a cylinder axis as viewed in a direction in which the crankshaft extends in such a manner as to extend toward a cylinder body side, so that the connecting bolts 30a are screwed into the connecting boss portions 12c, respectively.

10 Claims, 19 Drawing Sheets

LEFT-HAND SIDE VIEW

LEFT-HAND SIDE VIEW

RIGHT-HAND SIDE VIEW

LEFT-HAND SIDE VIEW

ARROW A VIEW

ENGINE FASTENING STRUCTURE

TECHNICAL FIELD

The present invention relates to an engine fastening structure for securely connecting a cylinder body or a cylinder head via the cylinder body to a crankcase with connecting bolts.

BACKGROUND ART

For example, in motorcycle engines, a construction in which a crankcase and a cylinder body are provided separately for connection to each other with connecting bolts or a construction in which a cylinder head is connected to a crankcase via a cylinder body interposed therebetween with connecting bolts is adopted in general.

Incidentally, a crankshaft is disposed below a mating surface of the crankcase, with which the cylinder body is brought into mating contact for connection, in such a manner as to pass through left and right side walls of the crankcase, and a great magnitude of load is applied to portions of the crankcase where crankshaft bearings are disposed due to combustion pressure. In general, crankcases are made of aluminum alloy, and in order to secure a rigidity which can bear the great magnitude of bearing load, there exist dimensional limitations such as the thickness of the crankcase and the diameter of the bearing portion.

Then, there has been proposed a construction in which a cast-iron bearing member for supporting a crankshaft bearing is embedded in a crankcase through insert casting (for example, refer to JP-A-8-21299).

Incidentally, in the conventional technique described in the Japanese unexamined patent publication, a construction is adopted in which a bearing portion of the bearing member is formed into a semi-circular shape, and a semi-circular cap member is fixedly bolted to the bearing portion with bolts, so that the crankshaft is supported by the cap member and the bearing portion. On the other hand, due to this construction, the bearing load applied by the combustion pressure acts in a direction in which the cap member is pulled away from the bearing portion. Consequently, a large load is eventually applied to the bolts that fasten the cap member, and as a result, the effect of the improved rigidity resulting from the insert casting the cast-iron bearing member in the crankcase is limited by the strength of the bolts.

The invention was made in view of the problem inherent in the conventional construction, and an object thereof is to provide an engine fastening structure which can largely improve the rigidity against the bearing load by embedding a bearing member in a side wall of a crankcase and which can largely improve the connecting force for connecting the crankcase and a cylinder body or a cylinder head.

DISCLOSURE OF THE INVENTION

According to a first aspect of the invention, there is provided an engine fastening structure for connecting a cylinder body or a cylinder head via the cylinder body to a crankcase with connecting bolts, characterized in that the crankcase is constructed in such a manner that an iron alloy bearing member for supporting a crankshaft bearing is insert cast in an aluminum alloy, in that the bearing member comprises a bearing portion which surrounds the circumference of a journal portion of a crankshaft, a bearing collar that is formed as a separate unit from the bearing portion, which is inserted into the bearing portion so as to be disposed in place therein and in which the crankshaft bearing is inserted to be fitted, and connecting boss portions which are integrally formed in such a manner as to extend toward a cylinder body side from sides of the bearing portion which are situated opposite across a cylinder axis as viewed in a direction in which the crankshaft extends, and in that the connecting bolts are screwed into the connecting boss portions, respectively.

Note that the invention involves both an engine comprising a crankcase, a cylinder body and a cylinder head which are provided separately and an engine comprising a crankcase, a cylinder body and a cylinder head in which the crankcase and cylinder body are formed integrally, whereas the cylinder head is provided separately.

According to a second aspect of the invention, there is provided an engine fastening structure as set forth in the first aspect of the invention, characterized in that a case side flange portion which is integrally formed on the cylinder body is connected to the crankcase with the connecting bolts, which are disposed so as to overlap the crankshaft bearing as viewed in a direction in which a cylinder bore axis extends.

According to a third aspect of the invention, there is provided an engine fastening structure as set forth in the first or second aspect of the invention, characterized in that a connecting boss portion is provided which is disposed so as to overlap the cylinder axis as viewed in the direction in which the crankshaft extends.

According to a fourth aspect of the invention, there is provided an engine fastening structure as set forth in any of the first to third aspects of the invention, characterized in that a balance shaft is disposed in parallel with the crankshaft in the vicinity thereof, and in that the balance shaft is supported by the iron alloy bearing member.

According to a fifth aspect of the invention, there is provided an engine fastening structure as set forth in any of the first to fourth aspect of the invention, characterized in that the crankcase is of a left and right divided type in which the crankcase is divided into left and right case portions in the direction in which the crankshaft extends, and in that the bearing member is embedded in a side wall of each of the left and right case portions so as to support left and right journal portions of the crankshaft.

According to a sixth aspect of the invention, there is provided an engine fastening structure as set forth in the fifth aspect of the invention, characterized in that the balance shaft which rotationally supports a balancer weight is also used as a connecting bolt for connecting the left and right crankcase portions together, and in that a flange portion which abuts with an outer surface of the bearing member is formed at one end portion of the balance shaft, whereas a threaded portion on which a nut member is to be screwed is formed at the other end portion of the balance shaft.

According to a seventh aspect of the invention, there is provided an engine fastening structure as set forth in any of the first to sixth aspects of the invention, characterized in that a cylinder body side end face of the connecting boss portion is embedded inwardly without being exposed to a cylinder body side mating surface of the crankcase.

According to an eight aspect of the invention, there is provided an engine fastening structure as set forth in the first aspect of the invention, characterized in that a gear is provided on the crankshaft so as to be positioned closer to a shaft end side than the crankshaft bearing, and in that the outside diameter of the bearing collar is set larger than the outside diameter of the gear so provided.

According to a ninth aspect of the invention, there is provided an engine fastening structure as set forth in the fourth aspect of the invention, characterized in that the bearing member comprises left and right bearing members, and in that the balance shaft is suspended by the left and right bearing members.

According to a tenth aspect of the invention, there is provided an engine fastening structure as set forth in the fourth or ninth aspect of the invention, characterized in that the balance shaft is supported by the bearing member so as to be situated between the crankshaft and the connecting boss portions as viewed in a direction normal to a plane containing the cylinder bore axis and a crankshaft axis.

BEST MODE FOR CARRYING OUT THE INVENTION

Figure 1:
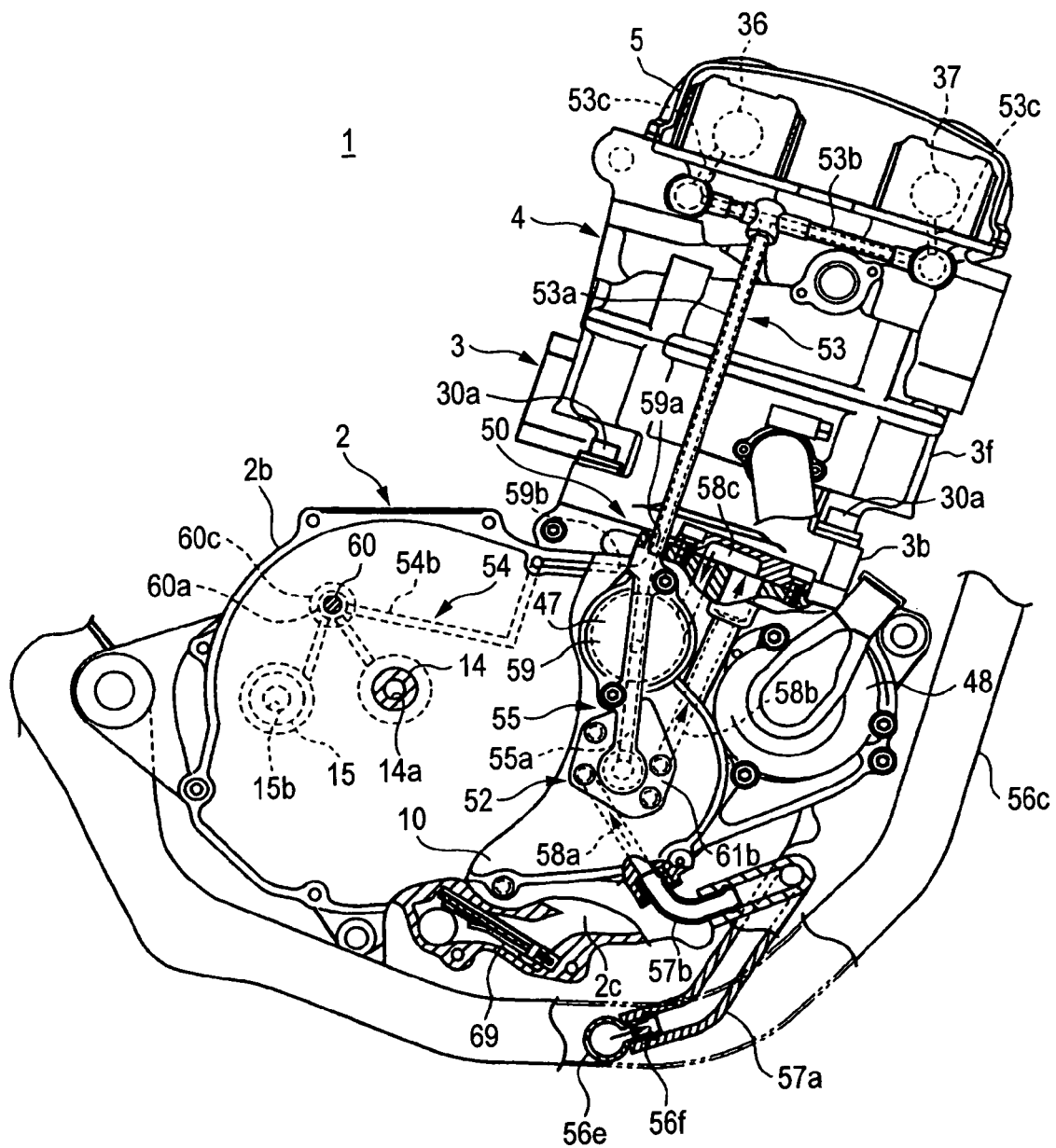
FIG. 1 is a right-hand side view of an engine according to an embodiment of the invention.
Figure 2:
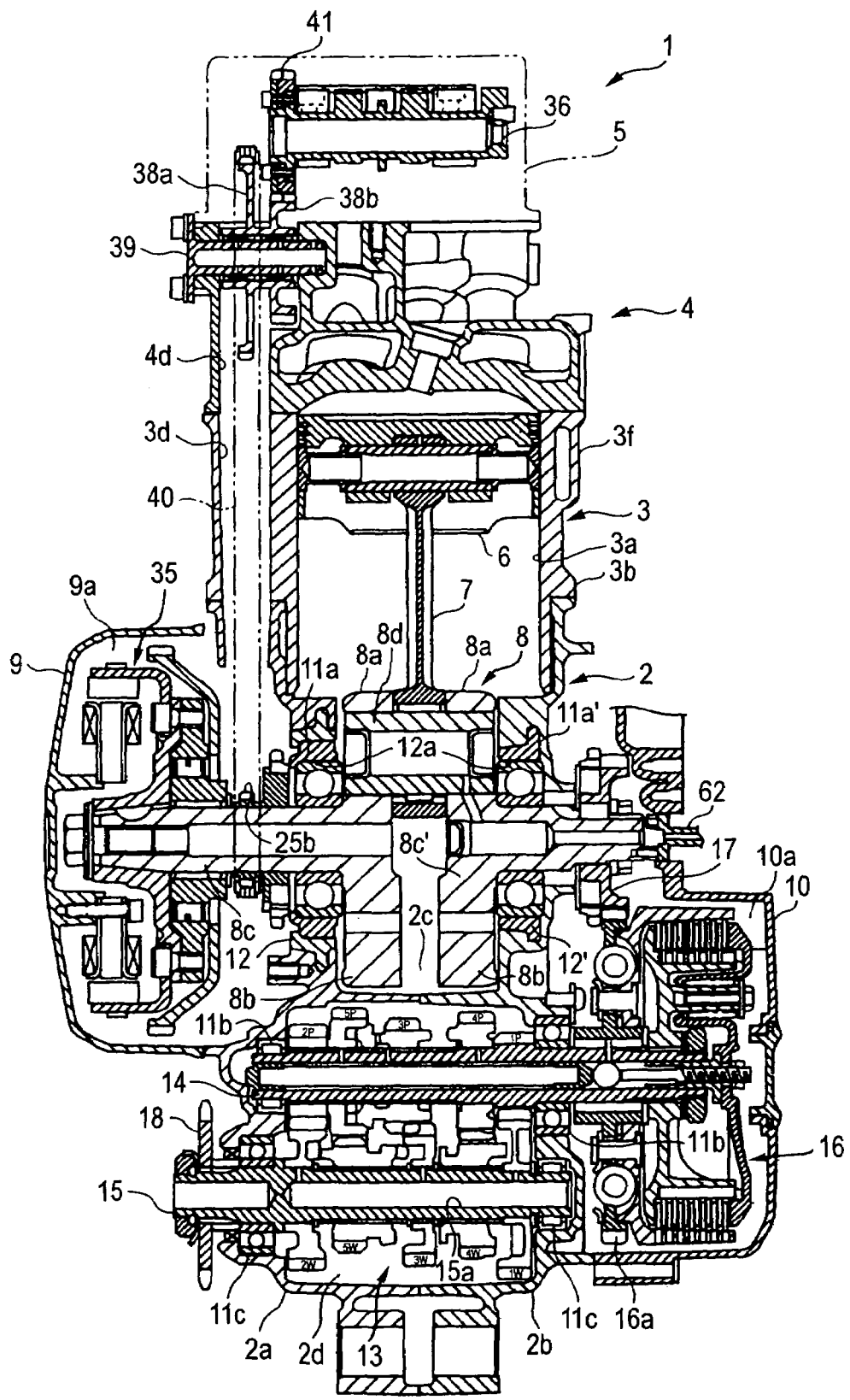
FIG. 2 is a sectional plan view showing a development of the engine.

Hereinafter, an embodiment of the invention will be described with reference to the accompanying drawings.

FIGS. 1 to 21 are drawings for describing an embodiment of the invention. In the drawings, reference numeral 1 denotes a water-cooled, 4-cycle, single cylinder, 5-valve engine, and in general, the engine has a construction in which a cylinder body 3, a cylinder head 4 and a cylinder head cover 5 are stacked on and fastened to a crankcase 2, and a piston 6 slidably disposed in a cylinder bore 3a in the cylinder body 3 is connected to a crankshaft 8 via a connecting rod 7.

The cylinder body 3 and the crankcase 2 are securely connected together by screwing four case bolts 30a which pass through a lower flange portion (a case side flange portion) 3b into a cylinder side mating surface 2e of the crankcase 2. To be more specific, the case bolts 30a are screwed into bolt connecting portions (connecting boss portions) 12c of iron alloy bearing brackets (bearing members) 12, 12' (which will be described later on) embedded in left and right wall portions of the aluminum alloy crankcase.2, respectively, through insert casting. Note that reference numeral 31a denotes a positioning dowel pin for positioning the crankcase 2 and the cylinder body 3.

In addition, the cylinder body 3 and the cylinder head 4 are connected together with two short head bolts 30b and four long head bolts 30c. The short head bolt 30b is screwed to be planted in a portion below an induction port 4c and a portion below an exhaust port in the cylinder head 4, extends downwardly to pass through an upper flange portion 3f of the cylinder block 3 and protrudes downwardly therefrom. Then, a cap nut 32a is screwed on the downwardly protruding portion of the short head bolt 30b, whereby the upper flange portion 3f and hence the cylinder body 3 are fastened to a cylinder side mating surface 4a of the cylinder head 4.

In addition, the long head bolt 30c is screwed to be planted in the lower flange portion 3b of the cylinder body 3, extends upwardly to pass from the upper flange portion 3f of the cylinder block 3 through a flange portion 4b of the cylinder head 4 and protrudes upwardly therefrom. Then, a cap nut 32b is screwed on the upwardly protruding portion of the long head bolt 30c, whereby the lower flange portion 3b and hence the cylinder body are fastened to the cylinder side mating surface 4a of the cylinder head 4.

Thus, in connecting the cylinder body 3 and the cylinder head 4 together, since not only the upper flange portion 3f of the cylinder body 3 is fastened to be fixed to the cylinder head 4 with the short head bolts 30b and the cap nuts 32 but also the long head bolts 30c are planted in the lower flange portion 3b which is fastened to be securely connected to the mating surface 2e of the crankcase 2, so that the cylinder body 3 is fastened to be fixed to the flange portion 4b of the cylinder head 4 with the long head bolts 30c and the cap nuts 32b, a tensile load generated by a combustion pressure comes to be borne by the cylinder body 3 and the four long head bolts 30c, so that a load applied to the cylinder body 3 can be reduced accordingly or by such an extent that the load is so borne by the cylinder body 3 and the long head bolts 30c. As a result, a stress generated at, in particular, an axially intermediate portion of the cylinder body 3 can be reduced, thereby making it possible to secure a required durability even in case the thickness of the cylinder body 3 is reduced.

Incidentally, in the event that only the upper flange portion 3f of the cylinder body 3 is connected to the cylinder head 4, an excessively large tensile stress is generated at the axially intermediate portion of the cylinder body 3, and in an extreme case, there occurs a concern that a crack is generated at the portion in question. In the embodiment, however, the generation of the excessively large stress at the intermediate portion of the cylinder body can be avoided due to the presence of the long head bolts 30c, thereby making it possible to prevent the generation of a crack.

In addition, in planting the long head bolts 30c in the lower flange portion 3b, since the long head bolts are disposed in the vicinity of the crankcase fastening case bolts 30a, respectively, the load generated by the combustion pressure can be transmitted from the cylinder head 4 to the crankcase 2 via the long head bolts 30c and the cylinder body in an ensured fashion, thereby making it possible to improve the durability against the load in this respect.

Figure 5:
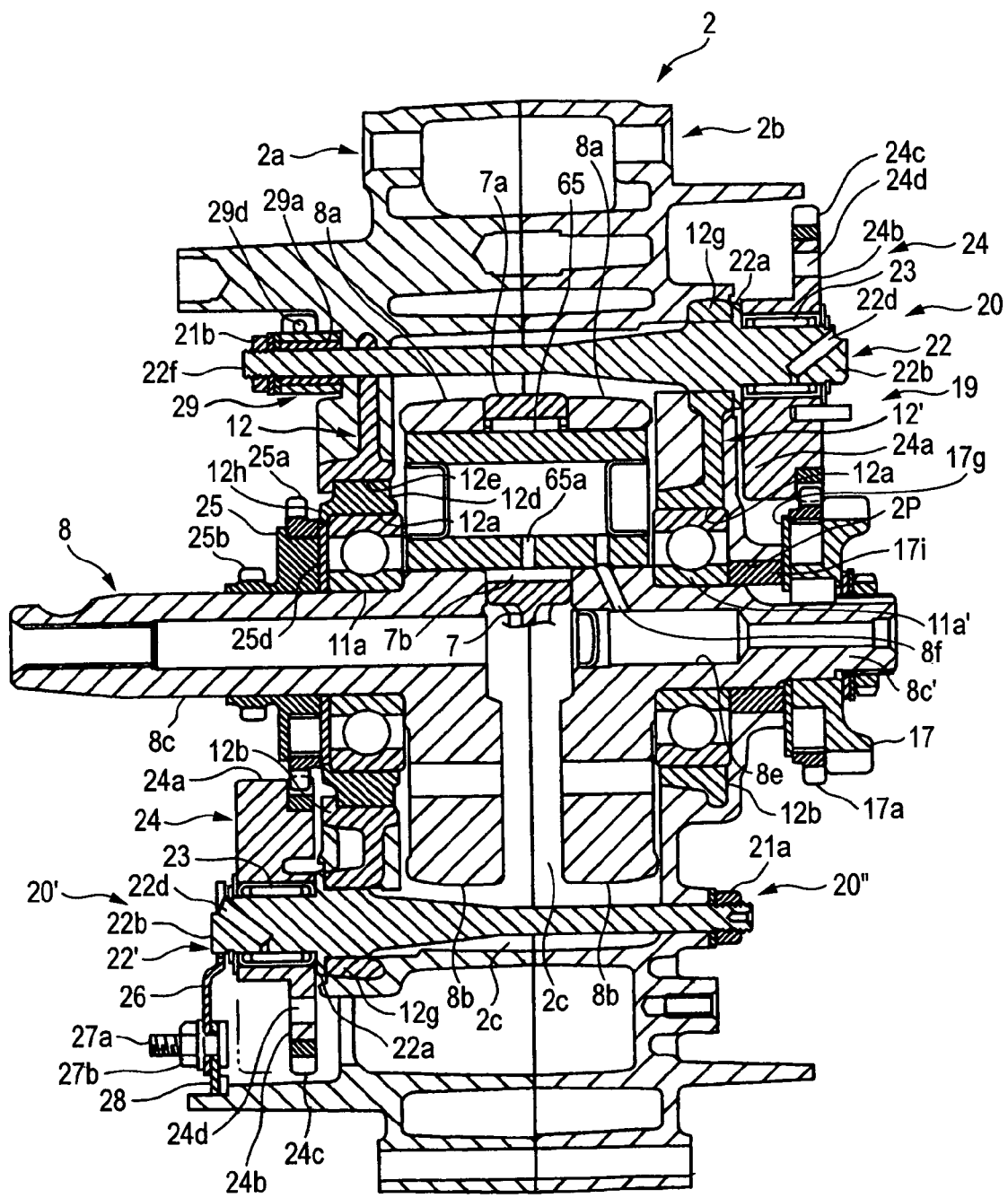
FIG. 5 is a sectional plan view showing a development of a balance shaft of the engine.
Figure 6:
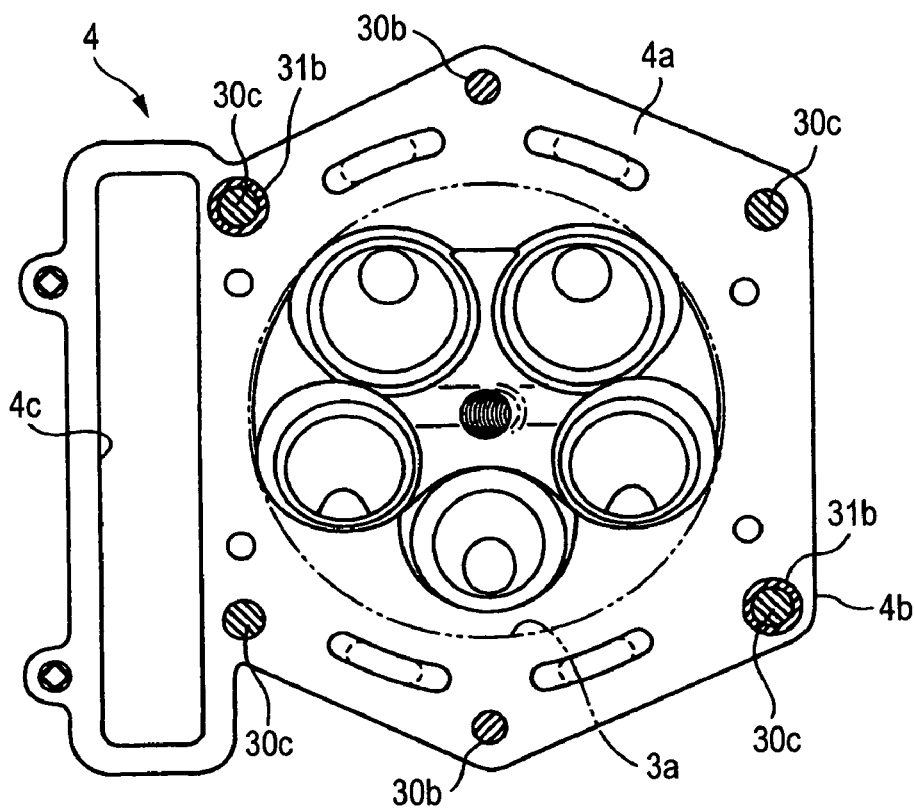
FIG. 6 is a bottom view of a cylinder head of the engine.
Figure 7:
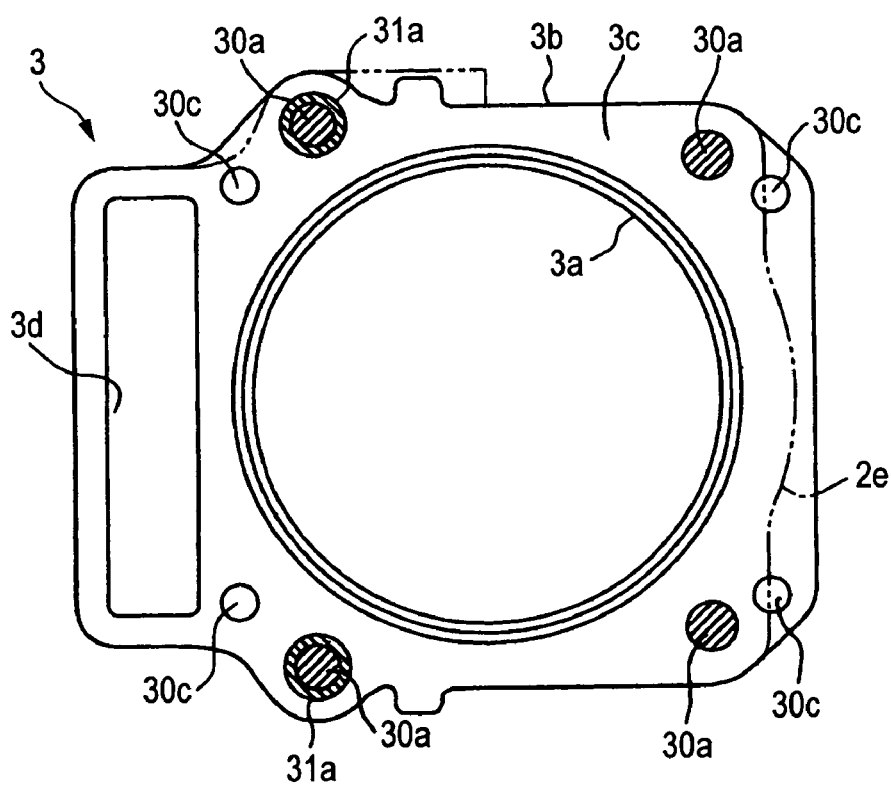
FIG. 7 is a bottom view of a cylinder body of the engine.
Figure 8:
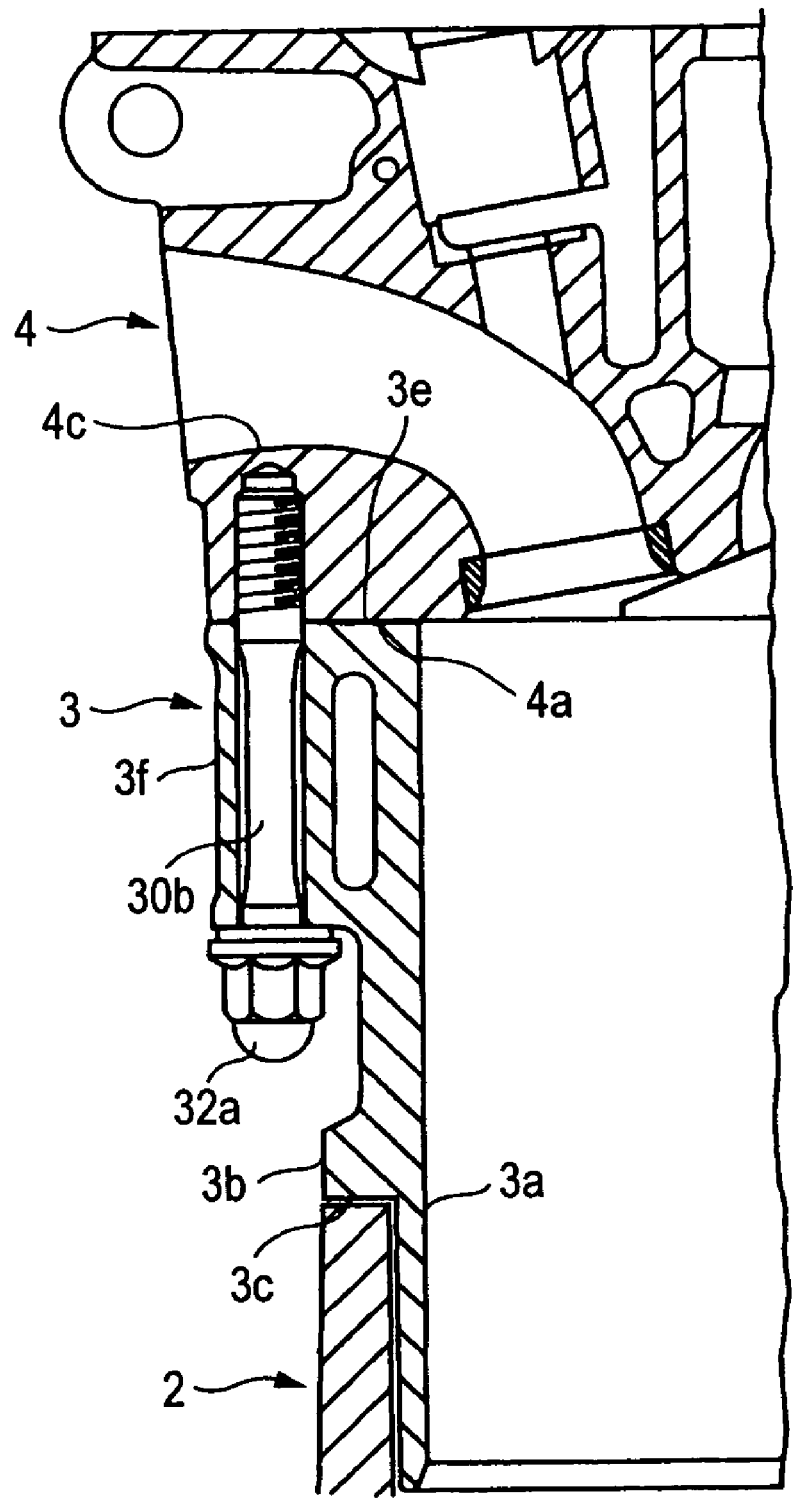
FIG. 8 is a sectional side view showing a portion where the cylinder head of the engine is connected to the cylinder body.
Figure 9:
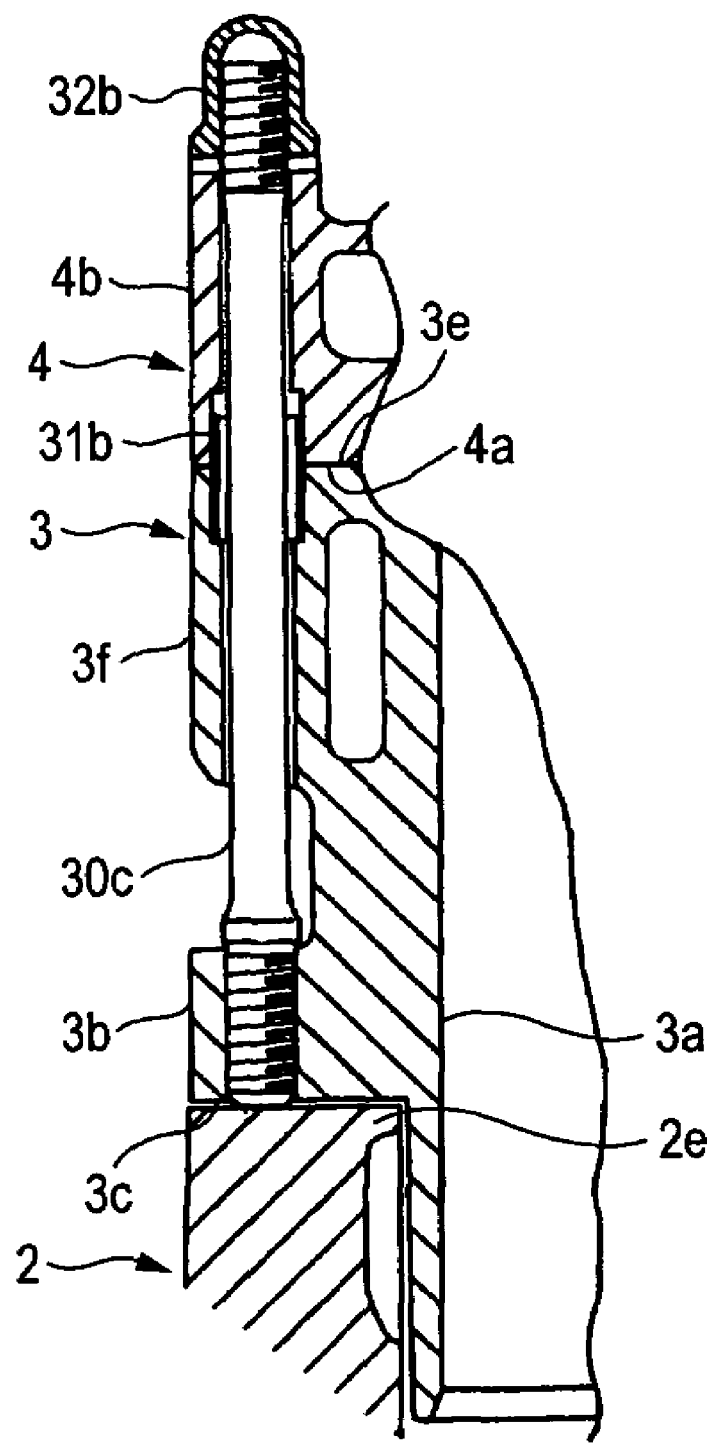
FIG. 9 is a sectional side view showing a portion where the cylinder body of the engine is connected to the crankcase.
Figure 10:
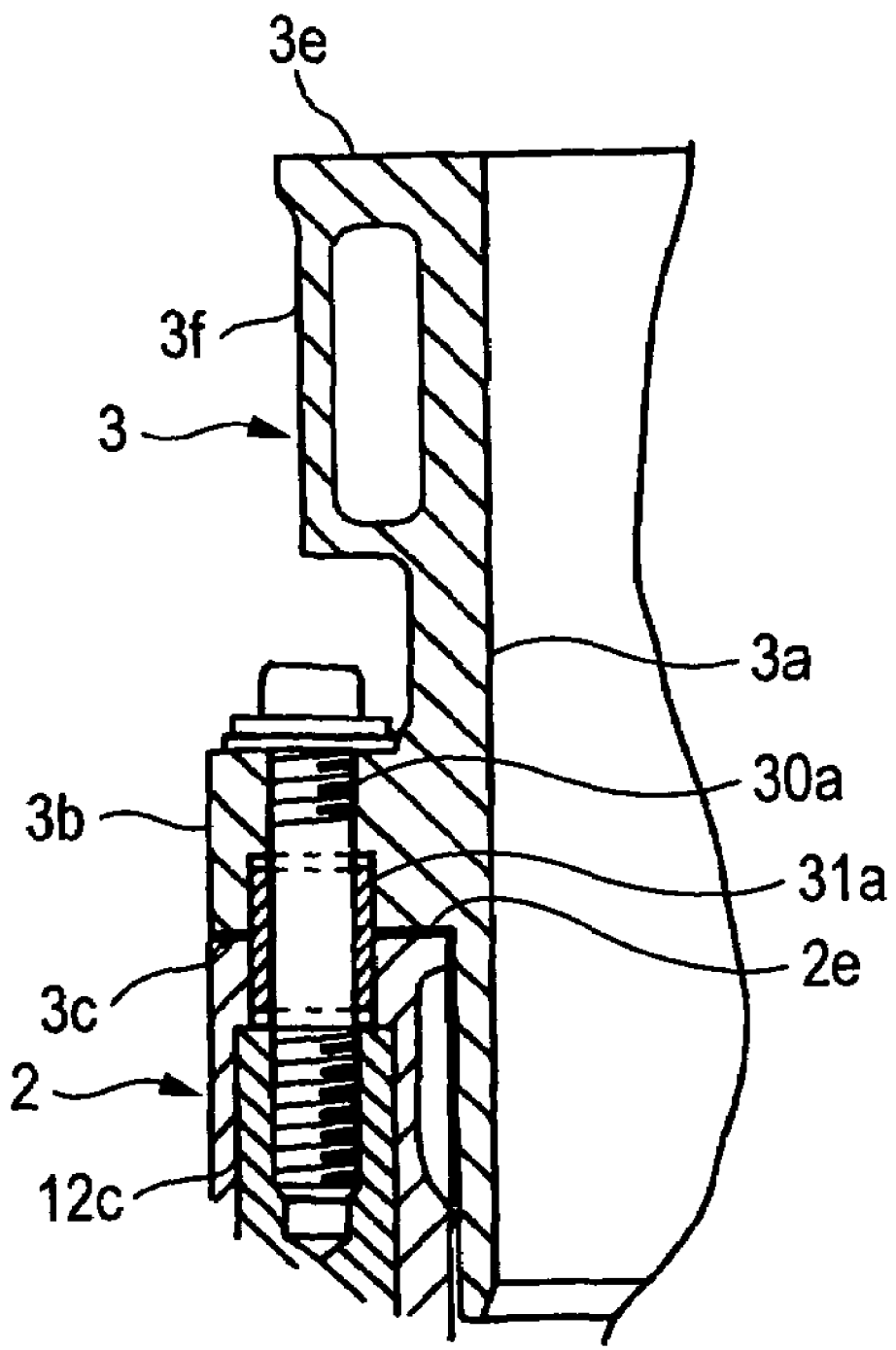
FIG. 10 is another sectional side view showing a portion where the cylinder body of the engine is connected to the crankcase.
Figure 16:
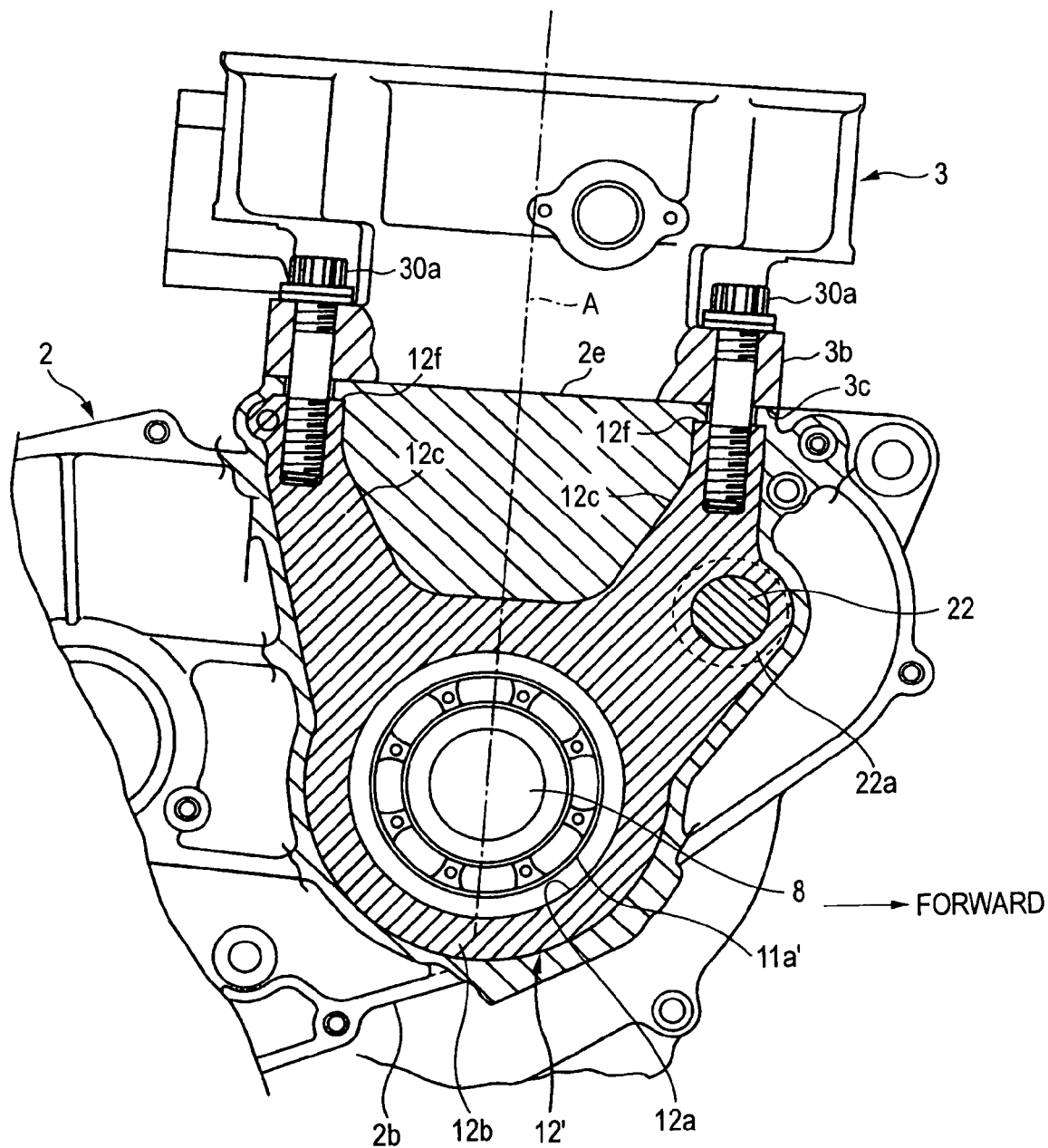
FIG. 16 is a sectional right-hand side view of a bearing bracket of the engine.

Here, as shown in FIGS. 5, 16, the right-side bearing bracket 12' has a boss portion 12b in which a right-side bearing 11a' of the crankshaft 8 is inserted to be fitted in a bearing hole 12a through press fit and hence which surrounds the outer circumference of the journal portion of the crankshaft 8. Then, the bolt connecting portions 12c, 12c extend upwardly from front and rear portions which hold the crankshaft 8 therebetween as seen in the direction in which the crankshaft 8 extends to the vicinity of the cylinder-side mating surface 2e of the crankcase 2.

Figure 17:
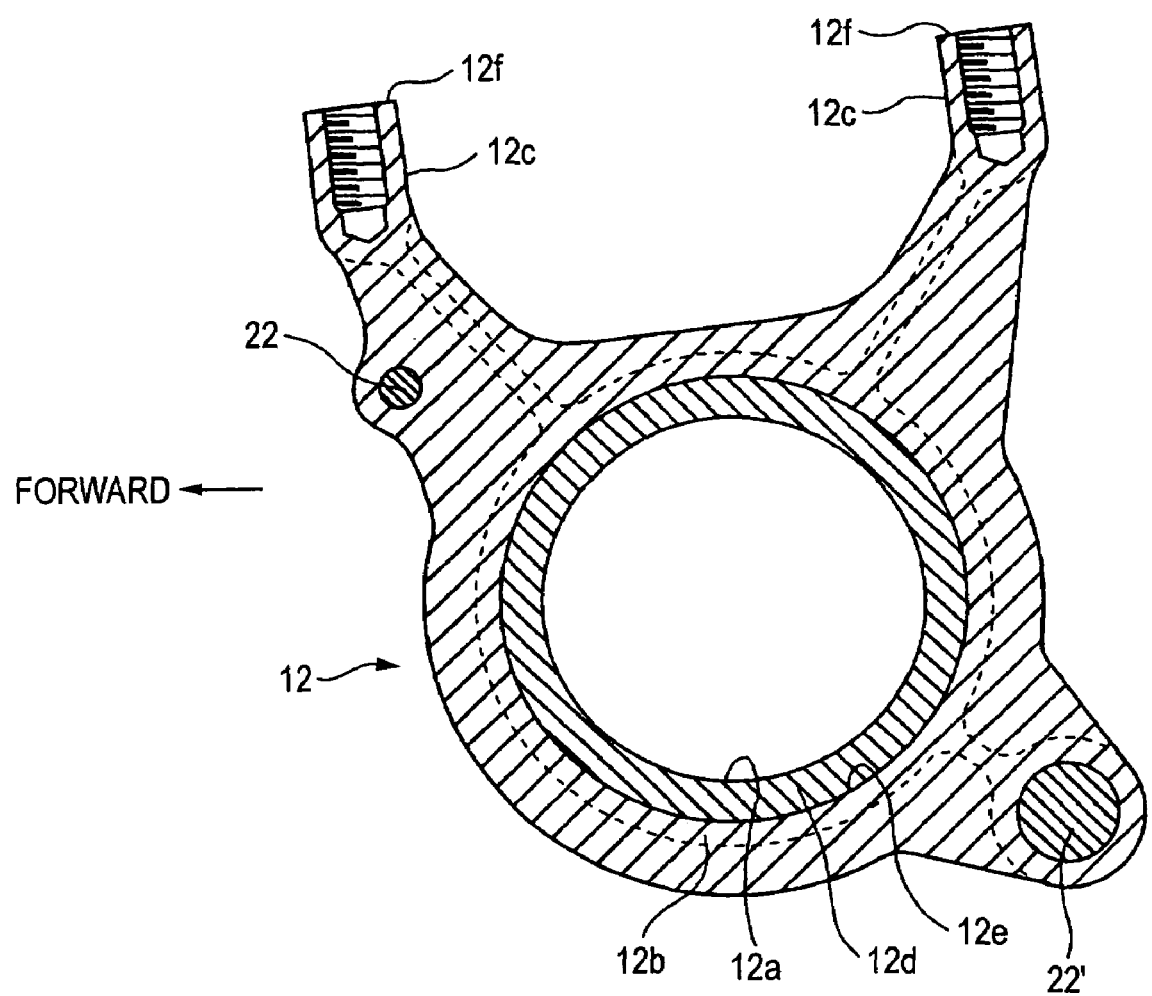
FIG. 17 is a sectional left-hand side view of a bearing bracket.
Figure 18:
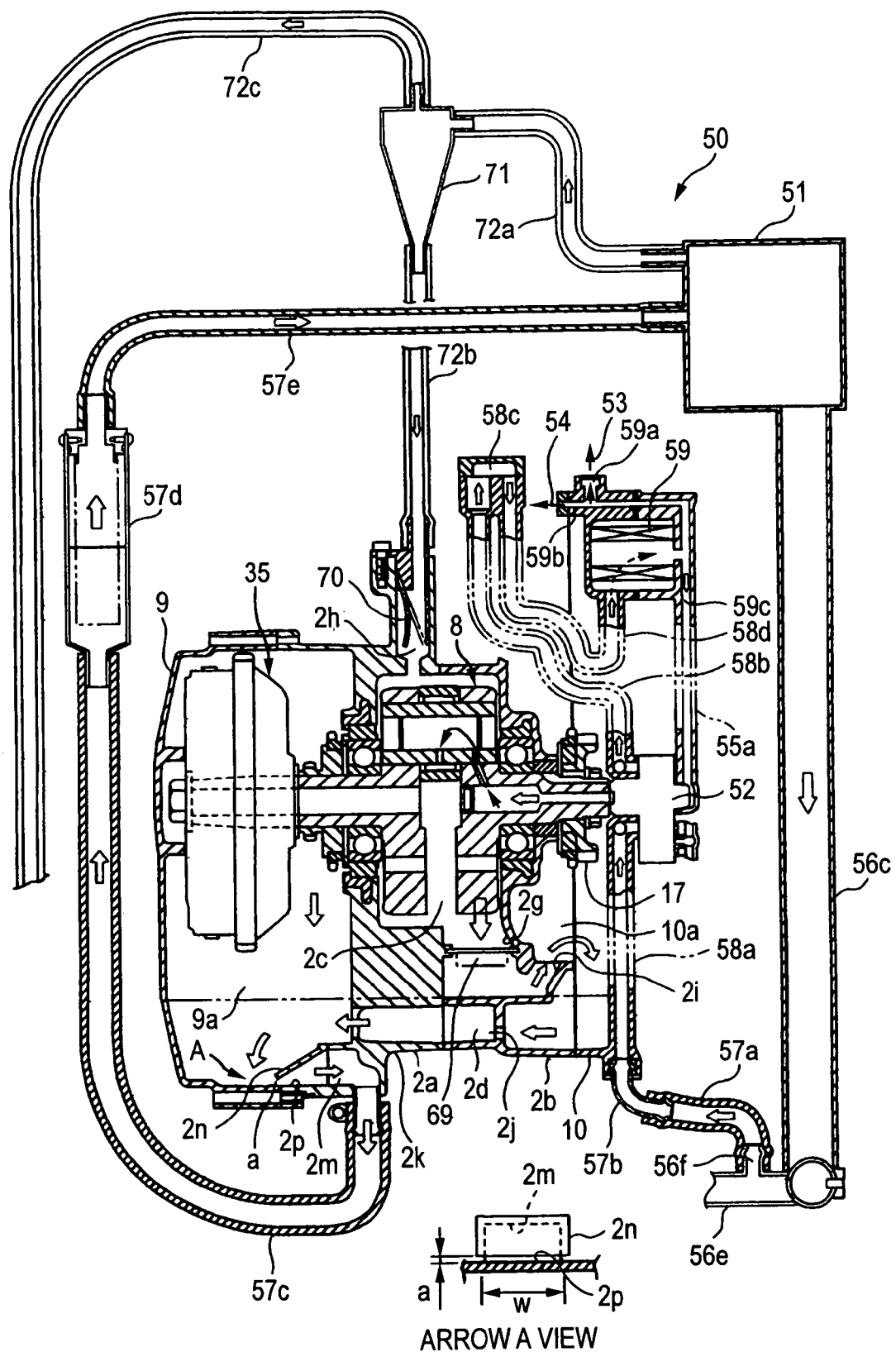
FIG. 18 is an explanatory drawing showing the construction of a lubrication system of the engine.
Figure 19:
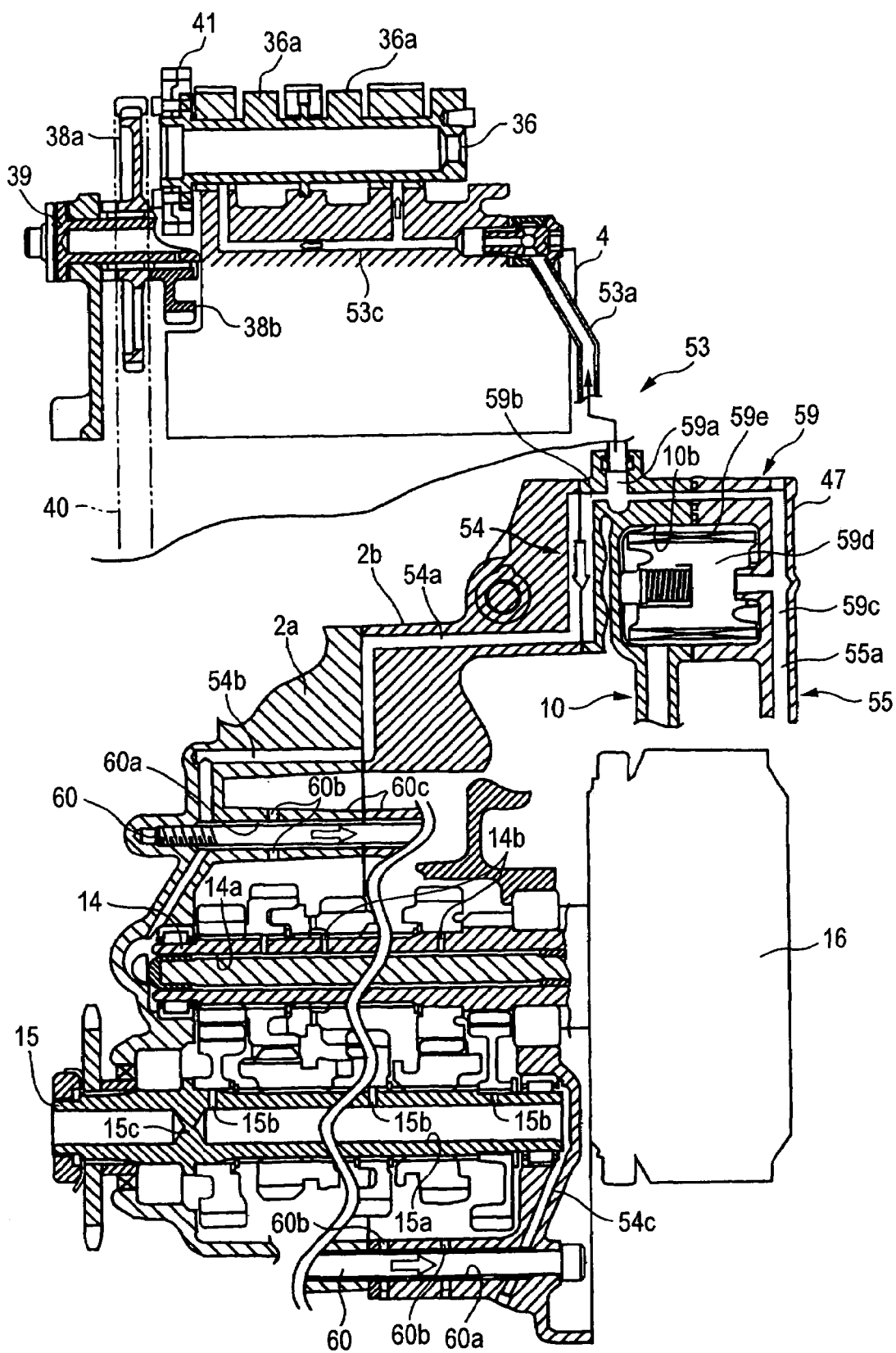
FIG. 19 is a drawing showing the construction of the lubrication system.
Figure 20:
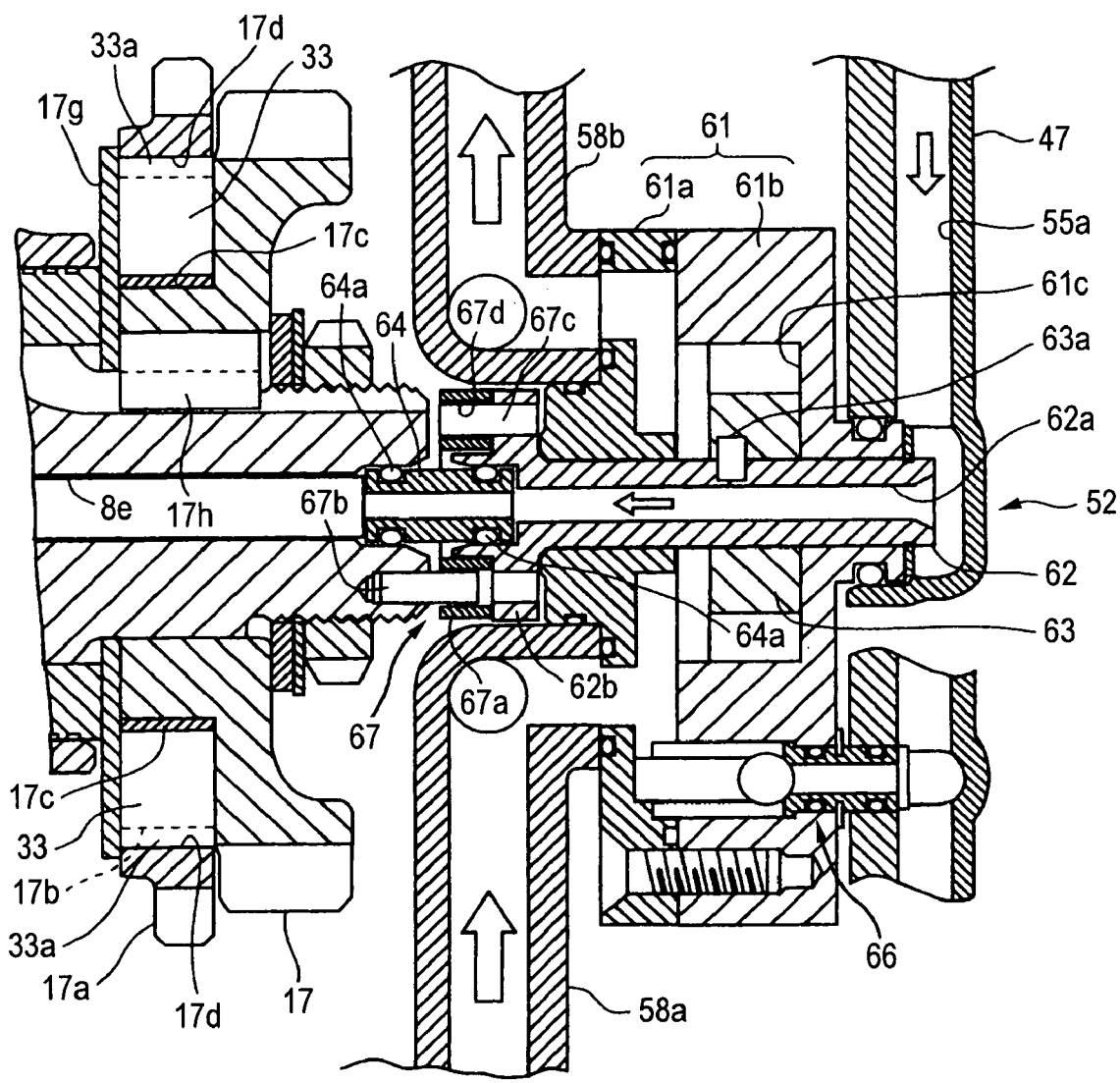
FIG. 20 is a sectional side view of an area surrounding a lubricating oil pump of the lubrication system.
Figure 21:
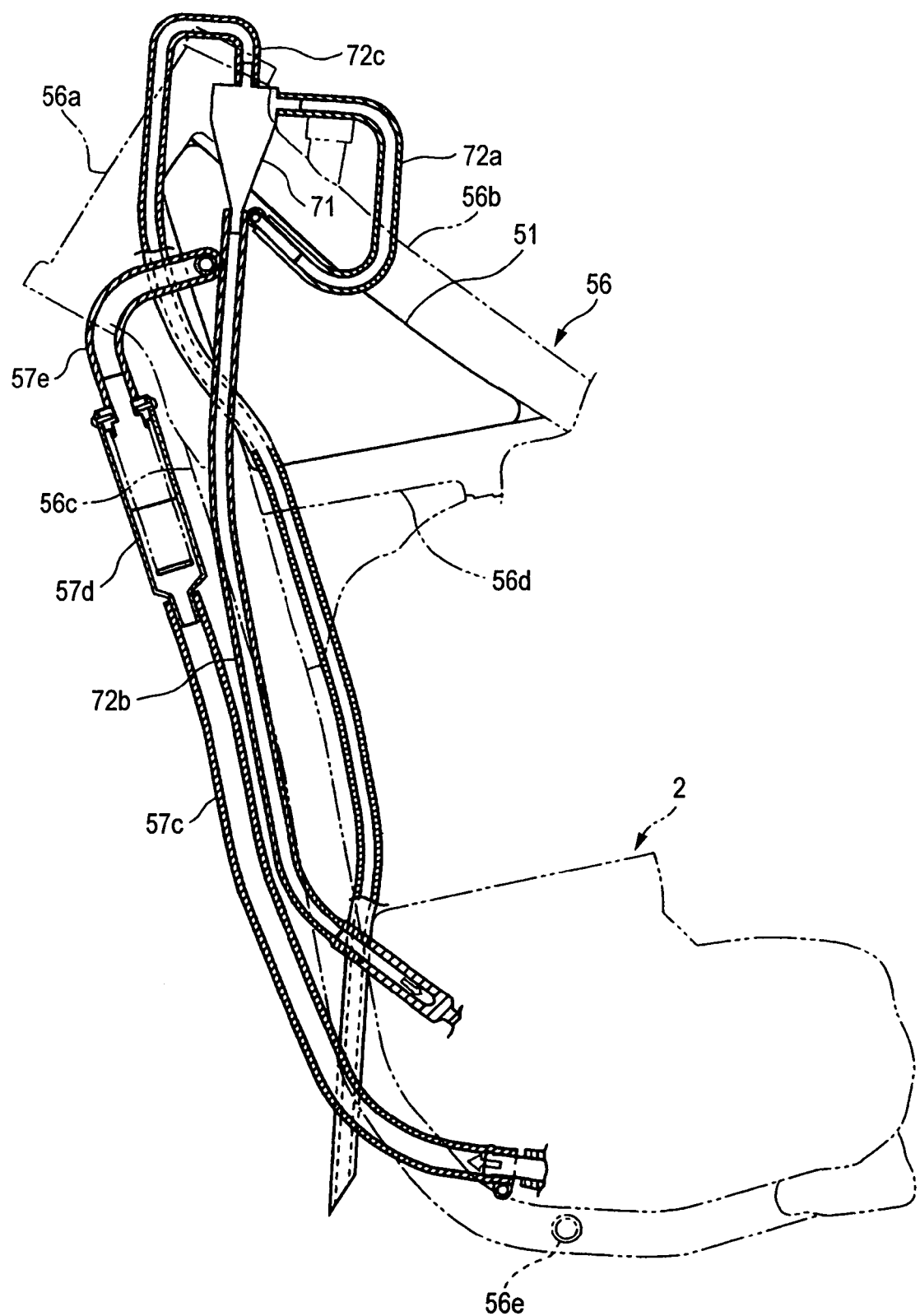
FIG. 21 is a sectional left-hand side view of the lubrication system.

In addition, in the left-side bearing bracket 12, as shown in FIGS. 5, 17, the bolt connecting portions 12c, 12c extend from front and rear portions which hold the crankshaft 8 therebetween as seen in the direction in which the crankshaft 8 extends to the vicinity of the cylinder-side mating surface 2e of the crankcase 2. In addition, a collar hole 12e is formed in the bearing portion 12b into which an iron bearing collar 12d having an outside diameter larger than that of a balancer driving gear 25a, which will be described later on, is press fitted. And, a left-side crankshaft bearing 11a is inserted to be fitted in the bearing hole 12a of the bearing collar 12d.

The case bolt 30a is screwed into the bolt connecting portion 12c, and when viewed in the direction A in which the cylinder bore axis extends, the case bolts 30a, 30a overlap the crankshaft bearings 11a, 11a', respectively, and in this way, the load generated by the combustion pressure is transmitted from the bearings 11a, 11a' to the cylinder body side via the connecting bolt portions 12c.

Note that, in this embodiment, the bolt connecting portions may be provided in such a manner as to overlap the cylinder bore axis A as viewed in the direction in which the crankshaft extends in addition to the left and right bolt connecting portions 12c or solely. In a case where this construction is adopted, there is no case where the connecting bolts and the bearing portions deviate from each other also in a direction normal to the crankshaft, thereby making it possible to transmit the load to the cylinder body side with a better efficiency.

Here, the bearing collar 12d is provided to facilitate the assembly of the crankshaft 8 in the crankcase 2 with a gear unit 25 having the balancer driving gear 25a being press fitted on the crankshaft 8.

In addition, as shown in FIG. 5, a seal plate 25d is interposed between the gear unit 25 on a left shaft portion 8c of the crankshaft 8 and the bearing 11a. An inside diameter side portion of the seal plate 25d is held by the gear unit 25 and an inner race of the bearing 11a, and a slight gap is provided between an outside diameter side portion thereof and an outer race of the bearing 11a for avoiding the interference therebetween. In addition, an inner circumferential surface of a flange portion 12h of the bearing collar 12d is brought into sliding contact with an outer circumferential surface of the seal plate 25d.

Furthermore, a seal tube 17i is interposed between the bearing 11a' of a right shaft portion 8c' of the crankshaft 8 and a cover plate 17g. An inner circumferential surface of the seal tube 17i is fixedly fitted on the right shaft portion 8c'. In addition, a seal groove having a labyrinth construction is formed in an outer circumferential surface of the seal tube 17i, and the outer circumferential surface of the seal tube 17i is brought into sliding contact with an inner circumferential surface of a seal bore 2p formed in the right case portion 2b.

Thus, the leakage of pressure within a crank compartment 2c is prevented by interposing the seal plate 25d and the seal tube 17i on the outside of the bearings 11a, 11a' on the left and right shaft portions 8c, 8c' of the crankshaft 8, so that the sending out of lubricating oil, which will be described later on, can be implemented with good efficiency.

In addition, according to the embodiment, since the bolt connecting portions (the connecting boss portions) 12c, 12c which extend toward the cylinder body 3 side are integrally formed on the sides situated opposite across the cylinder bore axis A of each of the iron alloy crankshaft supporting bearing members 12, 12' which are insert cast in the aluminum alloy crankcase 2 and the case bolts 30a for connecting the cylinder body 3 to the crankcase 2 are screwed into the bolt connecting portions 12c, respectively, the load generated by virtue of the combustion pressure can be borne uniformly by the two front and rear bolt connecting portions 12c which are situated opposite across the cylinder bore axis A, whereby the connecting rigidity between the cylinder body 3 and the crankcase 2 can be improved.

Additionally, since the bearing portions 12b surround the bearings 11a, 11a' and hence the journal portions 8c, 8c of the crankshaft 8, the strength of the bearing portion 12b can be secured to a large extent. In addition, the problem that the cap bolt constitutes a limitation on the bearing supporting strength can be avoided which would result from, for example, a construction in which semi-circular bearing portion and a semi-circular cap member are connected together with cap bolts.

In addition, since the connecting bolts 30a for connecting the case side flange portion 3b integrally formed on the cylinder body 3 to the connecting boss portions 12c are disposed in such a manner as to overlap the crankshaft bearings 11a, 11a' as viewed in the direction in which the cylinder bore axis A extends (refer to FIG. 7), there exists no case where the connecting bolts 30a and the bearing portions 12b deviate from each other in the direction in which the crankshaft extends, and therefore, the load generated by virtue of the combustion pressure can be transmitted to the cylinder body side with good efficiency, thereby making it possible to increase the connecting rigidity in this respect.

In addition, since balance shafts 22, 22' which are disposed in parallel with the crankshaft 8 in the vicinity thereof are supported by the iron alloy bearing members 12, 12' at at least one ends thereof, the supporting rigidity of the balance shafts 22, 22' can be increased.

Additionally, the crankcase 2 is of the left and right divided type made up of left and right case portions 2a, 2b, and the bearing members 12, 12' are embedded in the side walls of the left and right case portions 2a, 2b, respectively, so as to support the crankshaft journal portions 8c, 8c' by the left and right bearing members 12, 12', the assembling work of the crankshaft can be facilitated while the bearing members 12 are constructed such that the circumference of the journal portions are surrounded by the bearing portions 12b, thereby making it possible to improve the efficiency of the assembling work.

In addition, in the left-side bearing bracket 12, since the bearing collar 12 having the outside diameter larger than that of the balancer driving gear 25a is attached to the outer circumference of the bearing 11a, when assembling the crankshaft 8 in the crankcase 2 with the balancer driving gear 25a being attached to be fixed onto the crankshaft 8 through press fit or the like (or the balance driving gear 25a may of course be integrally formed on the crankshaft 8), there is caused no risk that the balancer driving gear 25a is brought into interference with a minimum inside diameter portion of the boss portion 12b of the bearing bracket 12, and hence the assembling of the crankshaft 8 can be implemented without any problem.

In addition, since the balance shafts 22, 22' are made to be also used as connecting bolts for connecting the left and right case portions 2a, 2b together and a flange portion 22a which abuts with the outer surface of the bearing member 12 is formed at one end portion of the balance shaft 22, whereas a threaded portion on which a nut member 12b is screwed is formed on the other end portion of the balance shaft 22, when the balance shaft 22 is made to be used as the case connecting bolt, the balance shaft 22 is made to tighten the outer surface of the bearing member 12 having a high strength, whereby a problem of deformation of an aluminum alloy crankcase that would arise when the crankcase is fastened by connecting bolts, thereby making it possible to secure the connecting rigidity of the left and right case portions.

Furthermore, in embedding the iron alloy bearing brackets 12, 12' in the aluminum alloy crankcase 2, since the upper end face 12f of the bolt connecting portion 12c is positioned inwardly without being exposed to the cylinder side mating surface 2e of the crankcase 2, there is no risk that metallic members which are different in hardness and material exist in a mixed fashion at a joint between the crankcase 2 and the cylinder block 3, thereby making it possible to avoid a reduction in sealing capability. Namely, in the event that the upper end face 12f of the bolt connecting portion 12c abuts with a case side mating surface formed on the lower flange 3b of the aluminum alloy cylinder body 3, the sealing capability is reduced due to a difference in thermal expansion coefficients.

The crankcase 2 is a two-piece type in which the crankcase 2 is divided into the left and right case portions 2a, 2b. A left case cover 9 is detachably attached to the left case portion 2a, and a space surrounded by the left case portion 2a and the left case cover 9 constitutes a flywheel magnet compartment 9a. A flywheel magnetic generator 35 attached to the left end portion of the crankshaft 8 is accommodated in this flywheel magnet compartment 9a. Note that the flywheel magnet compartment 9a communicates with a camshaft arranging compartment via chain compartments 3d, 4d, which will be described later on, whereby most of the lubricating oil which has been used to lubricate camshafts falls into the flywheel magnet compartment 9a via the chain compartments 3d, 4d.

In addition, a right case cover 10 is detachably attached to the right case portion 2b, and a space surrounded by the right case portion 2b and the right case cover 10 constitutes a clutch compartment 10a.

The crank compartment 2c and a transmission compartment 2d are formed at front and rear portions of the crankcase 2, respectively. The crank compartment 2c is made to open to the cylinder bore 3a but is defined substantially to be separated from the other compartments such as the transmission compartment 2d. Due to this, the pressure within the transmission compartment 2d is caused to fluctuate as the piston reciprocates vertically, thereby allowing the transmission compartment 2d to function as a pump.

The crankshaft 8 is arranged such that left and right arm portions 8a, 8a and left and right weight portions thereof are accommodated in the crank compartment 2c. The crankshaft 8 is an assembly including a left crankshaft portion into which the left arm portion 8a, weight portion 8b and shaft portion 8c are integrated and a right crankshaft portion into which the right arm portion 8a, weight portion 8b and shaft portion 8c' are integrated, the left crankshaft portion and the right crankshaft portion being connected integrally by press fitting a tubular crank pin 8d thereinto.

The left and right shaft portions (journal portions) 8c, 8c' are rotationally supported on the side walls of the left and right case portions 2a, 2b via the crankshaft bearings 1a, 11a'. As has been described above, the bearings 11a 11a' are press fitted in the bearing holes 12a in the iron alloy bearing brackets 12, 12' which are insert cast in the left and right case portions 2a, 2b of aluminum alloy.

A transmission 13 is accommodated and arranged in the transmission compartment 2d. The transmission 13 is such as to have a constant mesh construction in which a main shaft 14 and a drive shaft 15 are provided and arranged in parallel with the crankshaft 8, and first-speed to fifth-speed gears 1p to 5p attached to the main shaft 14 are made to constantly mesh with first-speed to fifth-speed gears 1w to 5w attached to the drive shaft 15.

The main shaft 14 is rotationally supported by the left and right case portions 2a, 2b via main shaft bearings 11b, 11b, whereas the drive shaft 15 is rotationally supported by the left and right case portions 2a, 2b via drive shaft bearings 11c, 11c.

A right end portion of the main shaft 14 passes through the right case portion 2b and protrudes to the right side, and a clutch mechanism 16 is attached to the protruding portion, and this clutch mechanism 16 is located within the clutch compartment 10a. Then, a large reduction gear (an input gear) 16a of the clutch mechanism 16 meshes with a small reduction gear 17 fixedly attached to the right end portion of the crankshaft 8.

A left end portion of the drive shaft 15 protrudes outwardly from the left case portion 2a and a driving sprocket 18 is attached to the protruding portion. This driving sprocket 18 is connected to a driven sprocket on a rear wheel.

A balancer unit 19 according to the embodiment includes front and rear balancers 20, 20' disposed opposite across the crankshaft 8 and having substantially the same construction. The front and rear balancers 20, 20' include the balance shaft 22, 22' which do not rotate and weights 24, 24 which are rotationally supported on the balance shaft via bearings 23, 23.

Here, the balance shafts 22, 22' are made to double as the case bolts (the connecting bolts) for connecting the left and right case portions 2a, 2b together in the direction in which the crankshaft extends. The respective balance shafts 22, 22' is also used to connect the left and right case portions together by causing flange portions 22a formed on insides of the rotationally supported weights 24 in a transverse direction of the engine to abut with outer end faces of boss portions 12g integrally formed on the bearing brackets 12', 12 which are insert cast into the left and right case portions 2a, 2b and screwing fixing nuts 21a, 21b on opposite ends of the respective balance shafts.

The weight 24 includes a semi-circular weight main body 24a and a circular gear supporting portion 24b which is integrally formed on the weight main body, and a ring-shaped balancer driven gear 24c is fixedly attached to the gear supporting portion 24b. Note that reference numeral 24b denotes a hole made in a part of the weight 24 which is situated opposite to the weight main body 24a so as to reduce the weight of the part to as low a level as possible.

The balancer driven gear 24c attached to the rear balancer 20' meshes with the balancer driving gear 25a which is rotationally attached relative to the gear unit 25 which is securely attached to the left shaft portion 8c of the crankcase 8 through press fit.

Figure 11:
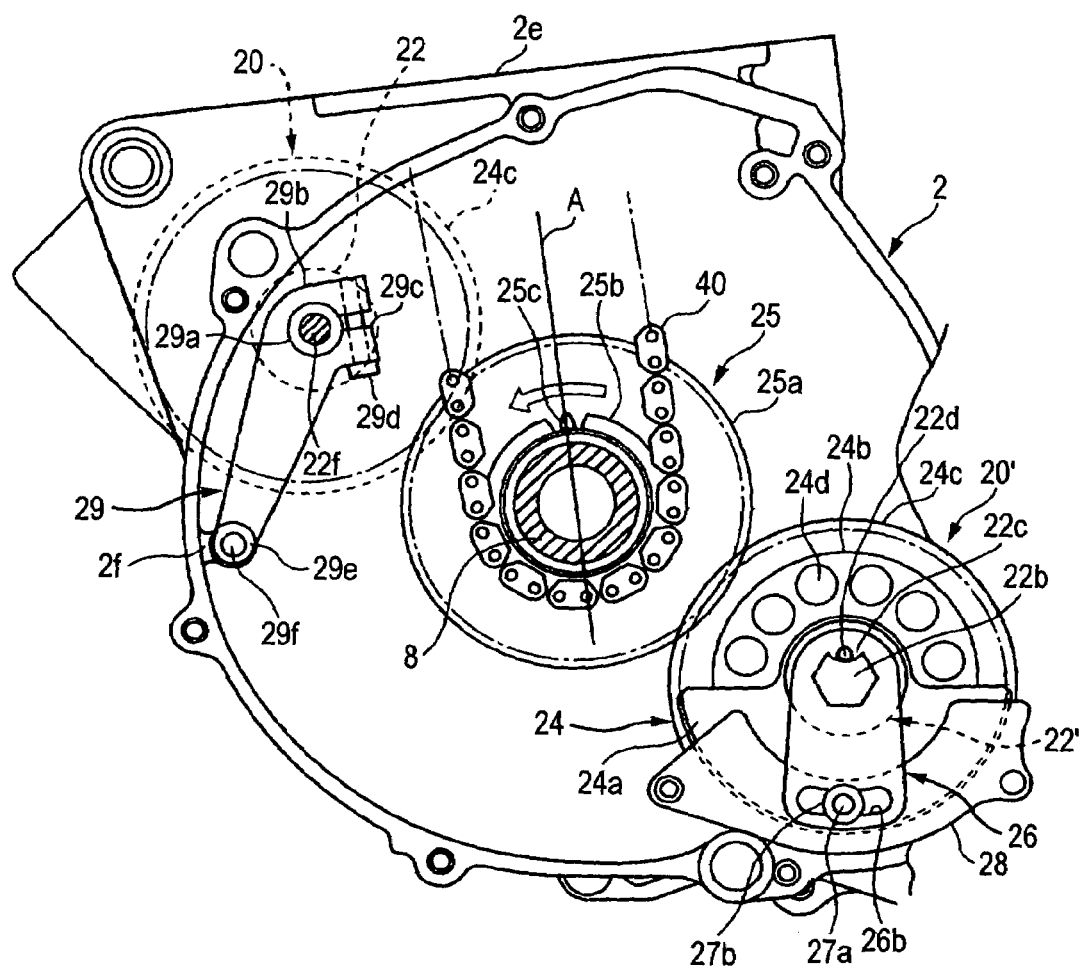
FIG. 11 is a left-hand side view showing a balancer unit of the engine.

Note that reference numeral 25b denotes a timing chain driving sprocket integrally formed on the gear unit 15 and has, as shown in FIG. 11, an aligning or timing mark 25c for alignment of timing marks for valve timing. The gear unit 25 is press fitted on the crankshaft 8 such that the timing mark 25c aligns with the cylinder bore axis A as viewed in the direction in which the crankshaft extends when the crankshaft 8 is situated at a top dead center of a compression stroke.

In addition, the balancer driven gear 24c attached to the front balancer 20 meshes with a balancer driving gear 17a which is supported rotationally relative to the small reduction gear 17 which is fixedly attached to the right shaft portion 8c' of the crankshaft 8.

Here, the rear balancer driving gear 25a is supported rotationally relative to the gear unit 25, and the front balancer driving gear 17a is supported rotationally relative to the small reduction gear 17. Then, U-shaped damper springs 33 each made up of a plate spring are interposed between the balancer driving gears 25a, 17a and the gear unit 25 and the small reduction gear 17, respectively, to thereby restrain the transmission of impact generated due to a torque fluctuation occurring in the engine to the balancers 20, 20' is restrained from being transmitted.

Figure 14:
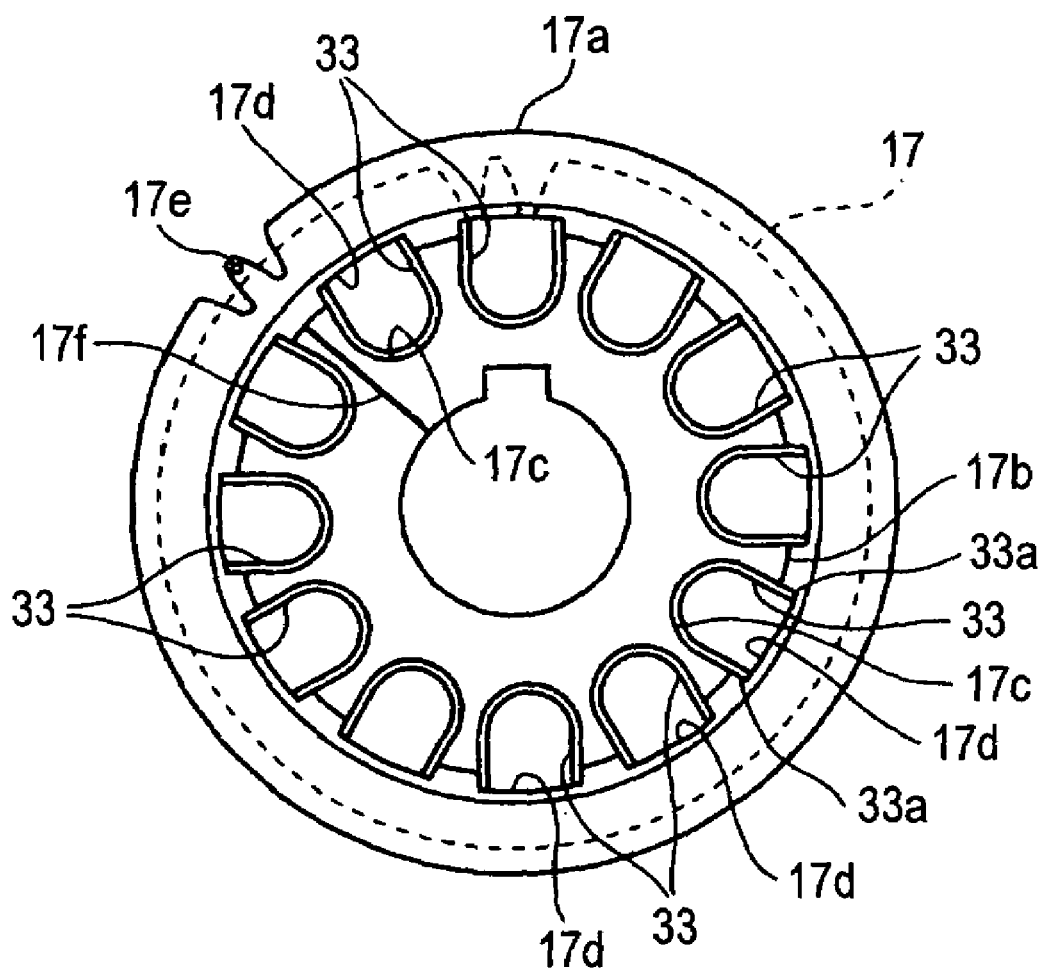
FIG. 14 is a side view showing a damping construction of a balancer drive gear of the balancer unit.
Figure 15:
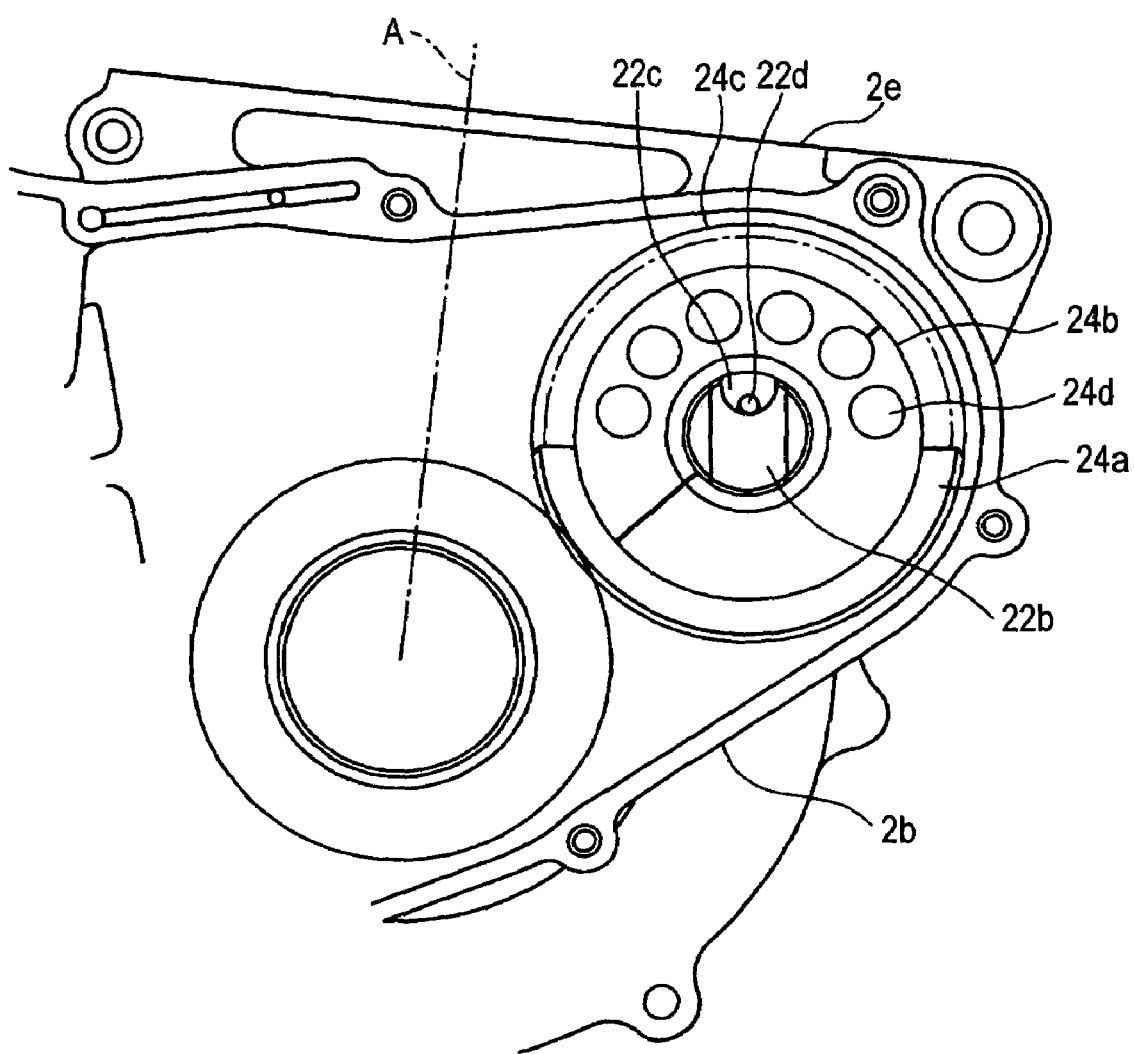
FIG. 15 is a right-hand side view of the balancer unit.

Here, while the balancer driving gear 17a for driving the front balancer 20 will be described in detail by reference to FIG. 14, the same description would be given if the balancer driving gear 25a for driving the rear balancer were described. The balancer driving gear 17a is formed into a ring shape and is supported by a sliding surface 17b formed so as to have a smaller diameter than the small reduction gear 17 rotationally relative to a side of the small reduction gear 17. Then, a number of U-shaped spring retaining grooves 17c are formed in the sliding surface 17b by setting them back into the surface thereof in a radial fashion about the center of the crankshaft, and the U-shaped damper springs 33 are arranged to be inserted in place within the spring retaining grooves 17c. Opening side end portions 33a, 33a of the damper spring 33 are locked at front and rear stepped portions formed in a locking recessed portion 17d formed in an inner circumferential surface of the balancer driving gear 17a.

When a relative rotation is generated between the small reduction gear 17 and the balancer driving gear 17a due to a torque fluctuation, the damper springs 33 resiliently deform in a direction in which the space between the end portions 33a, 33a narrows so as to absorb the torque fluctuation so generated. Note that reference numeral 17g denotes a cover plate for retaining the damper springs 33 within the retaining grooves 17c, reference numeral 17h denotes a key for connecting the small reduction gear 1 with the crankshaft 8, and reference numerals 17e, 17f denote, respectively, alignment marks for use in assembling the small reduction gear 17 and the balancer driving gear 17a.

A mechanism for adjusting a backlash between the balancer driven gears 24c, 24c and the balancer driving gears 25a, 17a is provided on the balancers 20, 20'. This adjusting mechanism is constructed such that the balancer axis of the balance shaft 22, 22' slightly deviates from the rotational center of the balancer driven gear 24c. Namely, when the balance shaft 22, 22' is made to rotate about the balancer axis, the space between the rotational center line of the balancer driven gear 24c and the rotational center line of the balancer driving gear 25a, 17a changes slightly, whereby the backlash is changed.

Here, a mechanism for rotating the balance shaft 22, 22' differs between the front balancer 20 and the rear balancer 20'. Firstly, in the rear balancer 20', a hexagonal locking protruding portion 22b is formed on a left end portion of the rear balance shaft 22', and a spline-like (a polygonal star-like) locking hole 26a formed in one end of a rotational lever 26 is locked on the locking protruding portion 22b. In addition, an arc-like bolt hole 26b is formed in the other end portion of the rotational lever 26 in such a manner as to extend about the balancer axis.

A fixing bolt 27a passed through the bolt hole 26b is planted in a guide plate 28. The guide plate 28 is generally formed into an arc-like shape and is fixedly bolted to the crankcase 2. Note that the guide plate 28 has also a function to control the flow of lubricating oil.

The adjustment of the backlash of the rear balancer 20' is implemented by rotating the rotational lever 26 so as to bring the backlash to an appropriate state with the fixing nut 21a being loosened and thereafter by fixing the rotational lever 26 with the fixing bolt 27a and a fixing nut 27b, and thereafter, the fixing nut 21a is refastened.

Figure 12:
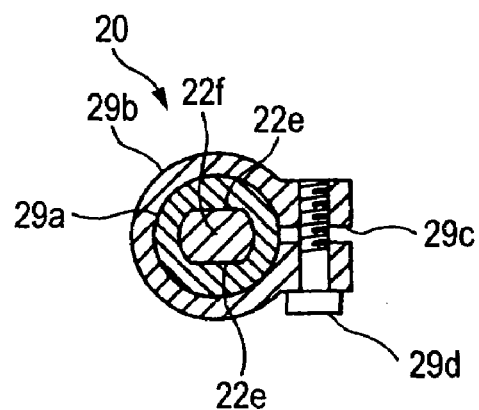
FIG. 12 is an enlarged cross-sectional view of a portion where a holding lever of the balancer unit is attached.
Figure 13:
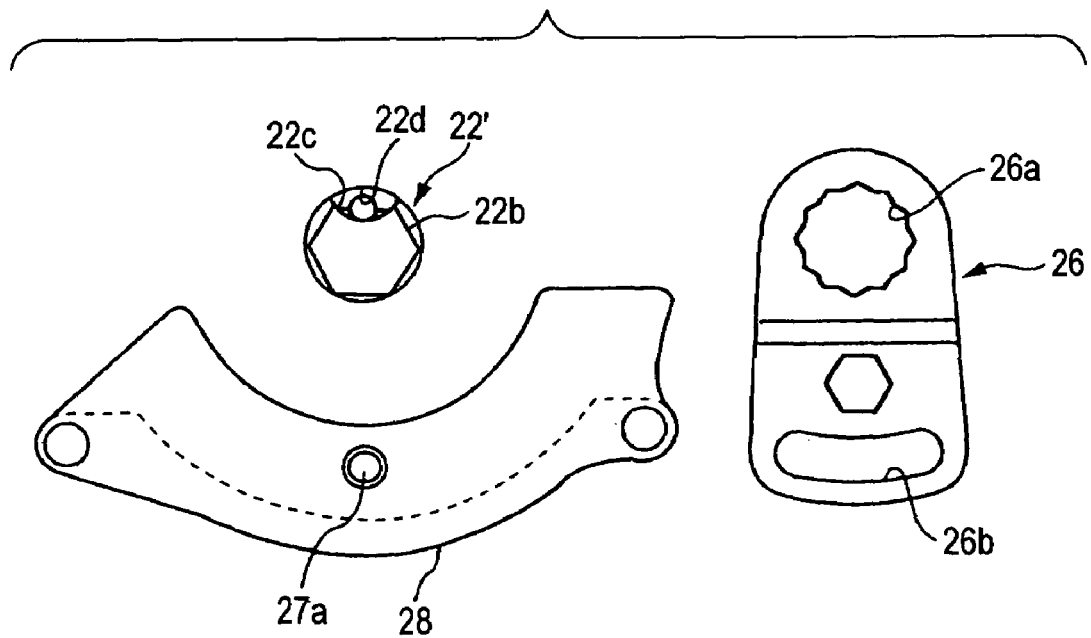
FIG. 13 is a side view of constituent components of a rotational lever of the balancer unit.

A grip portion 22f having an oval cross section, which is formed by forming a flat portion 22e on both sides of a cross-sectionally circular shape, is formed on a left end portion of the front balance shaft 22 (refer to FIG. 12). A collar 29a having an inner circumferential shape which matches an outer circumferential shape of the grip portion 22f is attached to the grip portion 22f, and furthermore, a holding portion 29b of a holding lever 29 is attached to an outside of the collar 29a in such a manner as to move axially but as not to rotate relatively. A distal end portion 29e of the holding lever 29 is fixed to a boss portion 2f of the left case portion 2a with a bolt 29f. In addition, a tightening slit 29c is formed in the holding portion 29b of the holding lever 29, so that the rotation of the collar 29 and hence of the balance shaft 22 is prevented by tightening up the fixing bolt 29d. Furthermore, the fixing nut 21b is screwed on the balance shaft 22 to an outer side of the collar 29 so as to be secured thereto via washer.

The adjustment of the backlash of the front balancer 20 is implemented by loosening the fixing nut 21b or preferably removing the same, griping the grip portion 22f of the balance shaft 22 with a tool to rotate the shaft so as to bring the backlash to an appropriate state, and thereafter tightening up the fixing bolt 29d, and thereafter, the fixing nut 21b is fastened.

In addition, a lubricating oil introducing portion 22c is formed in an upper portion of the locking protruding portion 22b by cutting out the upper in an arc. A guide bore 22d is made to open to the introducing portion 22c, and the guide bore extends into the balance shaft 22 and passes therethrough to below an outer circumferential surface of the balance shaft 22, whereby the lubricating oil introducing portion 22c is made to communicate with an inner circumferential surface of the balancer bearing 23. Thus, lubricating oil that has fallen in the lubricating oil introducing portion 22c is supplied to the balancer bearing 23.

Here, while the weight 24 and the balancer driven gear 24c are disposed at the right end portion along the direction in which the crankshaft extends in the front balancer 20, in the rear balancer 20', they are disposed at the left end portion. In addition, the balancer driven gear 24c is located rightward relative to the weight 24 in both the front and rear balancers 20, 20', and therefore, the weight 24 and the balancer driven gear 24c are set into the same configuration in both the front and rear balancers.

Thus, according to the embodiment, since the weight main body 24a and the balancer driven gear 24c of the balancer 20 are disposed on the right-hand side (one side) of the front balance shaft (the primary balance shaft) 22 along the direction in which the crankshaft extends and the weight main body 24a and the balancer driven gear 24c are disposed on the left-hand side (the other side) of the rear balance shaft (the secondary balance shaft) 22' along the direction in which the crankshaft extends, the reduction in balance in weight in the crankshaft direction that would result when providing a two-shaft balancer unit can be avoided.

In addition, since the front and rear balance shafts 22, 22' are made to double as the case bolts for connecting the left and right case portions 2a, 2b together, when adopting a two-shaft balancer unit, the connecting rigidity of the crankcase can be enhanced while restraining the construction of the engine from becoming complex and the number of components from being increased.

Additionally, since the balancer weight main body 24a and the balancer driven gear 24c are made integral and are supported rotationally by the balance shafts 22, 22', respectively, only the weight made up of the balancer weight main body 24a and the balancer driven gear 24c may be driven to rotate, and therefore, the engine output can be attempted to be used effectively to such an extent that the balance shafts themselves do not need to be driven to rotate.

In addition, the degree of freedom in assembling can be improved when compared with an engine construction in which a balancer weight and a balance shaft are made integral.

Additionally, since the rotational center lines of the balancer driven gears 24c are caused to deviate relative to the axes of the balance shafts 22, 22', the backlash between the balancer driven gears 24c and the balancer driving gears 25a, 27a on the crankshaft 8 side can be adjusted by the simple construction or only by a simple operation of rotating the balance shafts, thereby making it possible to prevent the generation of noise.

On the front balance shaft 22, the backlash adjustment is implemented by gripping the grip portion 22f formed on the left-hand side of the balance shaft 22 with a tool so as to rotate the balance shaft 22, and on the rear balance shaft 22', the backlash adjustment is implemented by rotating the rotational lever 26 provided on the left-hand side of the balance shaft 22'. Thus, on either of the front and rear balance shafts 22, 22', the backlash can be adjusted from the left-hand side of the engine, and hence the backlash adjusting work can be implemented efficiently.

Additionally, since the balancer driving gear 17a on the crankshaft 8 side which meshes with the balancer driven gear 24c is constructed to be disposed in such a manner as to rotate relatively to the sliding surface 17b of the small reduction gear 17 which is fixed to the crankshaft 8 and the U-shaped damper springs 33 are disposed in the spring retaining grooves 17c formed by setting them back from the sliding surface 17b, the impact generated due to the torque fluctuation in the engine can be absorbed by the compact construction so that the balancer unit can be operated smoothly. Note that the same description can be made with respect to the balancer drive gear 25a.

Furthermore, a coolant pump 48 is disposed at the right end portion of the front balance shaft 22 coaxially therewith. A rotating shaft of the coolant pump 48 is connected to the balance shaft 22 by an Oldham's coupling which has a similar construction to that of a lubricating oil pump 52, which will be described later on, in such a manner that a slight deviation between the centers of the rotating shaft and the balance shaft 22 can be absorbed.

In a valve train device of the embodiment, an intake camshaft 36 and an exhaust camshaft 37 which are disposed within the cylinder head cover 5 are constructed to be driven to rotate by the crankshaft 8. To be specific, a crankshaft sprocket 25b of the gear unit 25 press fitted on the left shaft portion 8c of the crankshaft 8 so as to be attached thereto and an intermediate sprocket 38a rotationally supported by a support shaft 39 planted in the cylinder head 4 are connected by a timing chain 40, and an intermediate gear 38 formed integrally on the intermediate sprocket 38a and having a smaller diameter than that of the intermediate sprocket 38a meshes with intake and exhaust gears 41, 42 secured to end portions of the intake and the exhaust camshafts 36, 37. Note that the timing chain 40 is disposed so as to pass through the chain compartments 3d, 4d formed on the left walls of the cylinder block 3 and the cylinder head 4.

The intermediate sprocket 38a and the intermediate gear 38b are rotationally supported by the support shaft 39 which passes through the chain compartment 4d on the cylinder head 4 in the direction in which the crankshaft extend along the cylinder bore axis A via two sets of needle bearings 44. The support shaft 39 is fixed at a flange portion 39a thereof to the cylinder head 4 with two bolts 39b. Note that reference numerals 39c, 39d denote a sealing gasket, respectively.

Here, commercially available (standard) bearings are adopted for the two sets of needle bearings 44, 44. A space adjusting collar 44a is disposed between the respective bearings 44, 44, and thrust washers 44b, 44b for receiving thrust load are provided at ends of the bearings. The thrust washer 44b is formed into a stepped shape having a large diameter portion which is brought into sliding contact with an end face of the intermediate sprocket and a stepped portion which protrudes axially toward the needle bearing 44.

Thus, since the space adjusting collar 44a is interposed between the two sets of bearings 44, 44, commercially available standard bearings can be adopted for the needle bearings by adjusting the length of the collar 44a, thereby making it possible to reduce costs.

In addition, since the washer having the stepped configuration is adopted as the thrust washer 44b, the assembling work of the intermediate sprocket 38a can be improved. Namely, in assembling the intermediate sprocket 38a, while the support shaft 39 is inserted from the outside in a state in which the intermediate sprocket 38a and the intermediate gear 38b are disposed within the chain compartment 4d with the thrust washers being positioned at the ends of the intermediate sprocket 38a and the intermediate gear 38b in such a manner as not to fall therefrom, the thrust washer 44b can be prevented from falling by allowing the stepped portion of the thrust washer 44b to be locked in a shaft hole in the intermediate sprocket 38a, and hence the assembling properties can be improved.

In addition, an oil hole 39e is formed in the support shaft 39 for supplying lubricating oil introduced from the cam compartment via an oil introducing bore 4e formed in the cylinder head 4 to the needle bearing 44.

Additionally, four weight reduction holes 38c and two inspection holes 38c adapted to be used at the time of assembling and made to double as weight reduction holes are formed at intervals of 60 degrees. Then, an alignment or timing mark 38d is stamped on a tooth situated substantially at the center of the inspection hole 38c' for the intermediate gear 38b, and timing marks 41a, 42a are also stamped on two teeth of intake and exhaust camshaft gears 41, 42 which correspond to the timing marks 38*d*. Here, when aligning the left and right timing marks 38*d*, 38*d* with the timing marks 41*a*, 42*a*, the intake and exhaust camshafts gears 41, 42 are located at positions, respectively, which correspond to a top dead center of a compression stroke.

Furthermore, timing marks 38*e*, 38*e* are also formed at portions of the intermediate sprocket 38*a* which are situated on a cover side mating surface 4*f* of the cylinder head 4 when the timing marks 38*d* align with 41*a*, 42*a*.

To align valve timings, firstly, the crankshaft 8 is held at a top dead center of a compression stroke by aligning the timing mark 25*c* (refer to FIG. 11) with the cylinder bore axis A. In addition, the intermediate sprocket 38*a* and the intermediate ear 38*b* which are attached to the cylinder head 4 via the support shaft 39 are positioned so that the timing mark 38*e* of the intermediate sprocket 38*a* aligns with the cover side mating surface 4*f*, and in this state, the crankshaft sprocket 25*b* and the intermediate sprocket 38*a* are connected by the timing chain 40. Then, the intake and exhaust camshaft gears 41, 42 on the intake and exhaust camshafts 36, 37 are brought into mesh engagement with the intermediate gear 38*b* while confirming through the inspection hole 38*c*′ that the timing marks 41*a*, 42*a* align with the timing mark 38*d* on the intermediate gear 38*b*, and the intake and exhaust camshafts 36, 37 are fixed to an upper surface of the cylinder head 4 via cam carriers.

Thus, since the inspection holes 38*c*′ made to double as the weight reduction holes to reduce the weight of the large diameter intermediate sprocket 38*a* are provided in the intermediate sprocket 38*a*, so that the alignment of the timing marks 38*d* on the small diameter intermediate gear 38*b* which is set on the back of the intermediate sprocket 38*a* with the timing marks 41*a*, 42*a* on the camshaft gears 41, 42 can be confirmed through the inspection holes 38*c*′, the meshing positions of the intermediate gear 38*b* with the camshaft gears 41, 42 can visually confirmed in an easy and ensured fashion while the small diameter intermediate gear 38*b* is placed on the back of the large diameter intermediate sprocket 38*a*, thereby making it possible to align the valve timings without any problem.

In addition, since the intermediate gear 38*b* can be disposed on the back side of the intermediate sprocket 38*a*, the dimension from the camshaft gears 41, 42 which mesh with the intermediate gear 38*b* to a cam nose 36*a* can be made shorter, whereby the torsional angle of the camshaft can be made smaller to such an extent that the dimension is made so shorter, thereby making it possible to make compact an area surrounding the camshafts.

Namely, for example, in a case where the intermediate gear 38*b* is disposed on a front side of the intermediate sprocket 38*a*, while the valve timings can easily be aligned, the dimension from the camshaft gears 41, 42 to the cam nose becomes long, and the torsional angle of the camshafts becomes large to such an extent that the dimension is extended, thereby reducing the control accuracy of valve opening and closing timings.

In addition, in a case where the intermediate gear 38*b* is disposed in front of the intermediate sprocket 38*a*, a space between the intermediate sprocket support shaft 39 and the camshafts 36, 37 needs to be expanded in order to avoid any interference between the intermediate sprocket 38*a* and the camshaft 36, 37, this causing a concern that the area surrounding the camshafts is enlarged.

Here, a backlash adjusting mechanism is provided between the intermediate gear 38*b* and the camshaft gears 41, 42. This adjusting mechanism has a construction in which the intake camshaft gear 41 and the exhaust camshaft gear 42 are made up of two gears such as a driving gear (a power transmission gear) 46 and a shift gear (an adjusting gear) 45 and the angular positions of the driving gear 46 and the shift gear 45 can be adjusted.

Namely, the shift gear 45 and the driving gear 46 are fixed to flange portions 36*b*, 37*b* formed at end portions of the camshafts 36, 37, respectively, in such a manner that the angular positions thereof can be adjusted by four circumferentially long elongated holes 45*a*, 46*a* and four long bolts 68*a*. A clearance portion 46*b* is cut and formed in the driving gear 46 that is disposed outwardly, and only the shift gear 45 is fixed in such a manner that the angular position thereof can be adjusted two elongated holes 45*b* and two short bolts 68*b* by making use of the clearance portion 46.

Figure 3:
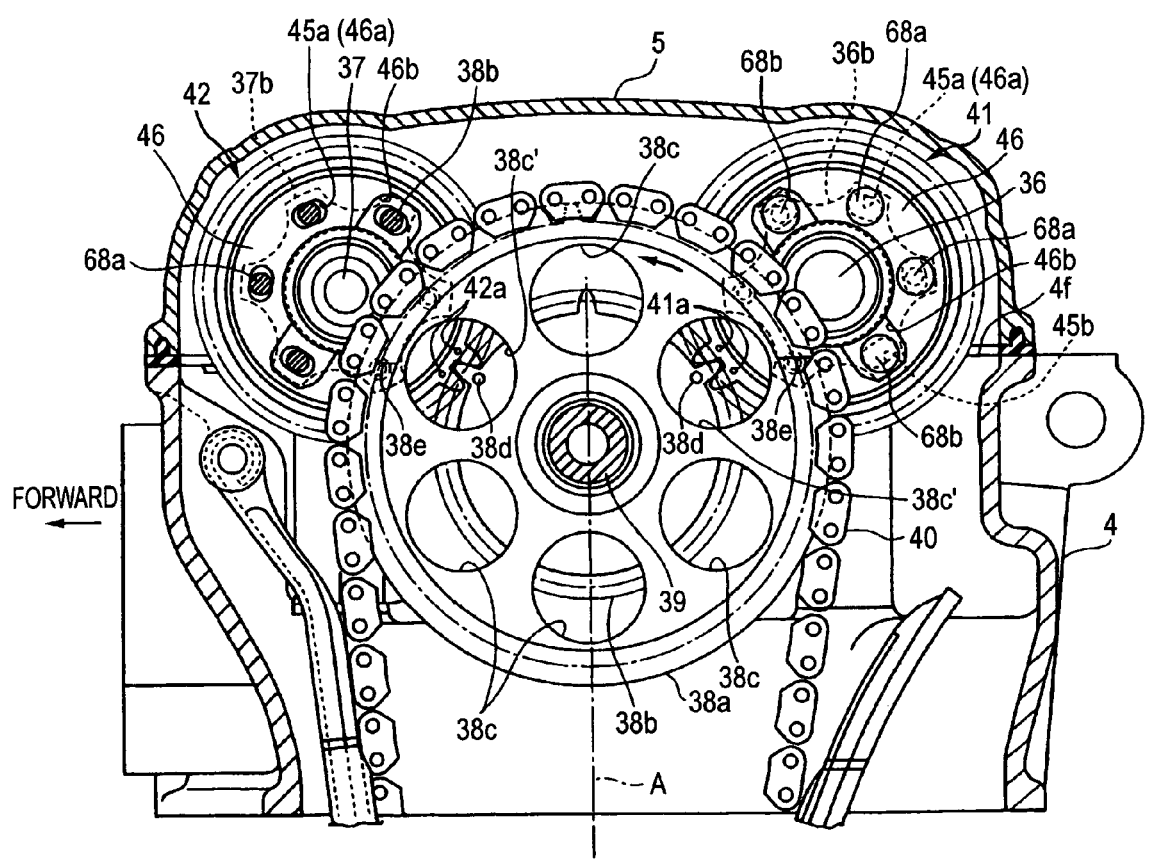
FIG. 3 is a left-hand side view showing a valve train device of the engine.
Figure 4:
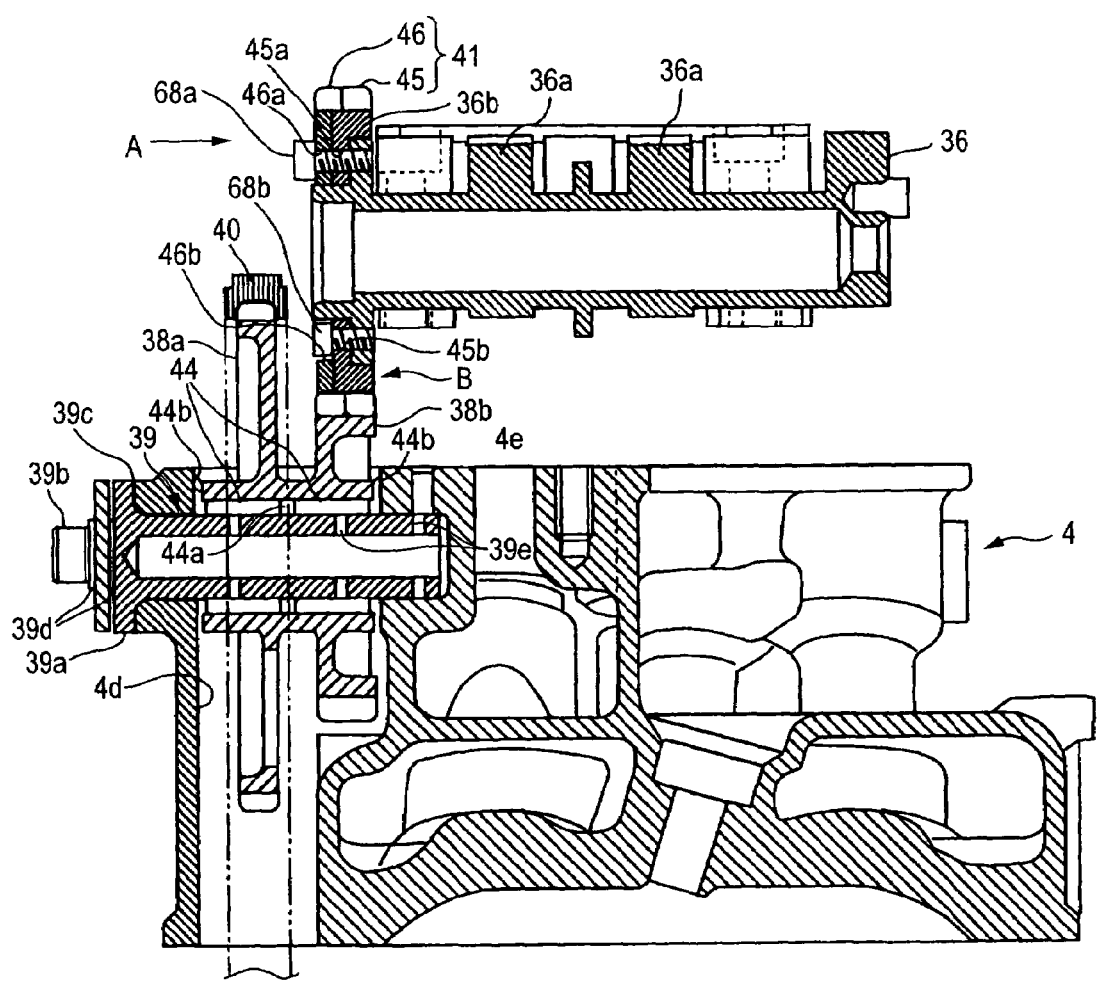
FIG. 4 is a sectional rear elevation of the valve train device.

A backlash adjustment is implemented according to the following procedure. Note that in the engine according to the embodiment, the intermediate gear 38*b* rotates counterclockwise as shown in FIG. 3 when viewed from the left-hand side of the engine. Consequently, both the intake camshaft gear 41 and the exhaust camshaft gear 42 rotate clockwise. In addition, here, while the backlash adjustment will be described with respect to the intake camshaft gear 41, the same description would be made with respect to the exhaust camshaft gear 42.

Firstly, all the fixing bolts 68*a*, 68*b* of the intake camshaft gear 41 are loosened, and the shift gear 45 is rotated clockwise so that front side surfaces of teeth of the shift gear 45 in the clockwise direction slightly abut with rear side surfaces of teeth of the intermediate gear 38*b* in the counterclockwise direction. In this state, the shift gear 45 is fixed to the flange portion 36*b* of the camshaft 36 with two short bolts 68*b*. Then, the driving gear 46 is rotated counterclockwise in such a manner that front side surfaces (driven surfaces) of teeth of the driving gear 46 in the counterclockwise direction abut with front side surfaces (driving surfaces) of the intermediate gear 38*b* in the counterclockwise direction so as to obtain a required backlash, and in this state, four long bolts 68*a* are tightened up, whereby the driving gear 46 and the shift gear 45 are fixed to the intake camshaft 36.

Thus, since the intake and exhaust camshaft gears 41, 42 are made up of the driving gear (power transmission gear) 46 and the shift (adjusting gear) 45 adapted to rotate relatively to the driving gear, respectively, the backlash can be adjusted by rotating the shift gear 45 relatively to the driving gear 46 forward or backward in the rotating directions.

Note that while, in this embodiment, both the driving gear 46 and the shift gear 45 which constitute the camshaft gears 41, 42 are described as being able to rotate relatively to the camshafts, one of the driving gear 46 and the shift gear 45 may be adapted to rotate relatively and the other gear may be integrated into the camshaft. In this case, it is desirable that the gear integrated into the camshaft constitutes the power transmission gear. Even if constructed in this way, similar function and advantage to those obtained by the embodiment can be obtained.

In addition, while in the embodiment, the invention is described as being applied to the construction in which the chain drive method is adopted, the invention can of course be applied to a drive method using a toothed belt.

Next, a lubricating construction will be described. A lubrication system 50 of the engine according to the embodiment is constructed such that lubricating oil stored within a separate lubricating oil tank 51 is picked up and pressurized by a lubricating oil pump 52 via a down tube 56*c* on a vehicle body frame, lubricating oil discharged from the pump 52 is divided into three systems such as a cam lubricating system 53, a transmission lubricating system 54 and a crank lubricating system 55 so as to be supplied to parts needing to be lubricated at the respective systems, and lubricating oil used for lubricating the respective parts needing lubrication is returned to the lubricating oil tank 51 by making use of pressure fluctuation occurring within the crank compartment 2c as the piston 6 reciprocates vertically.

The lubricating oil tank 51 is formed integrally within a space surrounded by a head pipe 56a, a main tube 56b, the down tube 56c and a reinforcement bracket 56d of the vehicle body frame 56. This lubricating oil tank 51 communicates with a cross pipe 56e which connects lower portions of the down tube 56c via the down tube 56c.

Then, the cross pipe 56e communicates with a pick-up port of the lubricating oil pump 52 via an outlet tube 56f connected thereto, an oil hose 57a, a joint pipe 57b and a pick-up passageway 58a formed in a crankcase cover 10. A discharge port of the lubricating oil pump 52 is connected to an oil filter 59 via an oil discharge passageway 58b, an external portion connecting chamber 58c and an oil passageway 58d and is divided into the three lubrication systems 53, 54, 55 on a secondary side of the oil filter 59.

The oil filter 59 is constructed such that an oil element 59e is disposed in a filter compartment 59d defined by detachably attaching a portion of a cover 47 to a filter recessed portion 10b provided in the right case cover 10 by setting part thereof further back from the rest.

The cam lubricating system 53 has a construction which is generally constructed such that a lower end of a vertical member 53a of a T-shaped lubricating oil pipe is connected to a cam side outlet 59a of an oil passageway formed on the outside of the filter recessed portion 10b, whereas left and right ends of a horizontal member 53b of the lubricating oil pipe are connected to a camshaft oil supply passageway 53c, so that lubricating oil is supplied to parts such as bearings of the camshafts 36, 37 which need to be lubricated via the passageway 53c.

The transmission lubrication system 54 has the following construction. A right transmission oil supply passageway 54a formed within the right case portion 2b is connected to a transmission side outlet 59b of the oil filter 59, and the oil supply passageway 54a communicates with the interior of a main shaft bore 14a formed in the main shaft 14 along the axial center thereof via a left transmission oil passageway 54b formed in the left case portion 2a. Then, this main shaft bore 14a communicates with sliding portions between the main shaft 14 and change-speed gears via a plurality of branch bores 14b, whereby lubricating oil supplied to the main shaft bore 14a passes through the branch bores 14b to be supplied to the sliding portions.

In addition, an intermediate portion of the left transmission oil passageway 54b communicates with a bolt bore 60a through which a case bolt 60 for connecting the left and right case portions 2a, 2b together is allowed to pass. This bolt bore 60a is such as to be formed by forming a bore having an inside diameter which is slightly larger than the outside diameter of the case bolt 60 in tubular boss portions 60c, 60c which are formed so as to face and abut with each other on the mating surface between the left and right case portions 2a, 2b. The boss portion 60c is situated in the vicinity of a portion where a gear train on the main shaft 14 meshes with a gear train on the drive shaft 15, and a plurality of branch bores 60b are formed from which lubricating oil within the bolt bore 60a is spouted out toward the gear trains meshing portion. Note that the bolts 60 shown in FIG. 19 as being developed into the left and right case portions are the same bolt.

Furthermore, a right end portion of the bolt bore 60a communicates with a drive shaft bore 15a formed in the drive shaft 15 along the axial center thereof via a communication bore 54c. Then, the drive shaft bore 15a is closed by a partition wall 15c at a left-hand side portion and communicates with sliding portions between the drive shaft 15 and driving gears via a plurality of branch bores 15b. Thus, lubricating oil supplied into the drive shaft bore 15a passes through the branch bores 15b to be supplied to the sliding portions.

The crank lubricating system 55 has the following construction. A crank oil supply passageway 55a is formed in the filter cover 47 in such a manner as to extend from a crank side outlet 59c toward the lubricating oil pump 52, and the passageway 55 is made to communicate with a communication bore 62a which is formed in a rotating shaft 62 of the lubricating oil pump 52 to pass therethrough along the axial center thereof. Furthermore, the communication bore 62a communicates with a crank oil supply bore 8e formed in the crankshaft 8 to pass therethrough along the axial center thereof via a connecting pie 64. Then, this crank oil supply bore 8e communicates with the interior of a pin bore 65a in a crank pin 65 via a branch bore 8f, and the pin bore 65a is made to open to the rotating surface of a needle bearing 7b at a big end portion 7a of a connecting rod 7 via a branch bore 65b. Thus, lubricating oil filtered in the oil filter 59 is supplied to the rotating surface of the needle bearing 7b.

The lubricating oil pump 52 has the following construction. A pump compartment 61c is provided in a right case 61b of a two-piece casing made up of left and right cases 61a, 61b by setting a relevant portion of the case further back from the rest, and a rotor 63 is disposed rotationally within the pump compartment 61. The rotating shaft 62 is inserted into the rotor 63 along the axial center thereof in such a manner as to pass therethrough to be disposed in place therein, and the rotating shaft 62 and the rotor 63 are fixed together with a pin 63a. Note that the oil pick-up passageway 58a and oil discharge passageway 58b are connected to a pump compartment upstream side and a pump compartment downstream side of the left case 61a, respectively. In addition, reference numeral 66 denotes a relief valve for retaining the discharge pressure of the lubricating oil pump 52 to a predetermined value of lower and adapted to relieve the pressure on the discharge side of the lubricating oil pump 52 to the oil pick-up passageway 58a side when the pressure on the discharge side reaches or exceeds the predetermined value.

The rotating shaft 62 is a tubular shaft which passes through the pump case 61 in the axial direction and opens to the crank oil supply passageway 55a at a right end portion thereof as shown in the drawing. In addition, a power transmitting flange portion 62b is formed integrally at a left end portion of the rotating shaft 62 as shown in the drawing. The flange portion 62b faces a right end face of the crankshaft 8, and the flange portion 62b and the crankshaft 8 are connected together by an Oldham's coupling 67 in such a manner as to absorb a slight deviation of the centers of the shafts.

The Oldham's coupling 67 is constructed such that a coupling plate 67a is disposed between the crankshaft 8 and the flange portion 62b, a pin 67b planted in the end face of the crankshaft 8 and a pin 67c planted in the flange portion 62b are inserted into a connecting bore 67d in the coupling plate 67a.

In addition, the connecting pipe 64 is such as to connect a right end opening in the crankshaft 8 to a left end opening in the rotating shaft 62, and sealing is provided by an oil seal 64a between the inner circumference of the crankshaft opening and the inner circumference of the rotating shaft opening and the outer circumference of the connecting pipe 64.

Here, as has been described above, the crank compartment 2c is defined separately from the other transmission compartment 2d, the flywheel magnet compartment 9a and the clutch compartment 10a, whereby an oil return mechanism is constructed in which the pressure within the crank compartment 2c is fluctuated to be positive and negative as the piston 6 strokes, so that lubricating oil in the respective compartments is returned to the lubricating oil tank 51 by virtue of the pressure fluctuation.

To describe this in detail, a discharge port 2g and a suction or pick-up port 2h are formed in the crank compartment 2c. A discharge port reed valve 69 adapted to open when the pressure within the crank compartment is positive is disposed in the discharge port 2g, and a pick-up port reed valve 70 adapted to open when the pressure within the crank compartment is negative is disposed in the pick-up port 2h.

Then, the discharge port 2g communicates with the clutch compartment 10a from the crank compartment 2c via a communication bore 2i and then communicates with the transmission compartment 2d from the clutch compartment 10a via a communication bore 2j. Furthermore, the transmission compartment 2d communicates with the flywheel magnet compartment 9a via a communication bore 2k. A return port 2m formed so as to communicate with the flywheel magnet compartment 9a communicates with the lubricating oil tank 51 via a return hose 57c, an oil strainer 57d and a return hose 57e.

Here, a guide plate 2n is provided at the return port 2m. This guide plate 2n has a function to ensure the discharge of lubricating oil by modifying the return port 2m so as to provide a narrow gap a between a bottom plate 2p and itself and to secure a wide width b.

Additionally, an oil separating mechanism for separating oil mists contained in the air within the tank by virtue of centrifugal force so as to return oil mists so separated to the crank compartment 2c. This oil separating mechanism has a construction in which an introduction hose 72a which is connected to an upper portion of the lubricating oil tank 51 at one end thereof is tangentially connected to an upper portion of a cone-shaped separating compartment 71 at the other end and a return hose 72b connected to a bottom portion of the separating compartment 71 is connected to the pick-up port 2h of the crank compartment 2c. Note that the air from which the oil mists are separated is discharged to the atmosphere via an exhaust hole 72c.

Thus, according to the embodiment, since the crank chamber 2c is made to be a substantially closed space so that the pressure therein fluctuates as the piston 6 reciprocates vertically, whereby lubricating oil that has flowed into the crank compartment 2c is sent back to the lubricating oil tank 51 by virtue of pressure fluctuation within the crank compartment 2c, the necessity of an exclusive oil sending pump (a scavenging pump) can be obviated, and hence the construction of the engine can be simplified and costs can be attempted to be reduced.

In addition, since the discharge port reed valve (an outlet side check valve) 69 adapted to open when the pressure in the crank compartment increases and to close when the pressure lowers is disposed in the vicinity of where the oil sending passageway is connected to the crank compartment 2c, the lubricating oil within the crank compartment 2c can be sent back to the lubricating oil storage tank 51 in a more ensured fashion.

In addition, since an portion above the oil level within the lubricating oil storage tank 51 is connected to the crank compartment 2 via the return hoses 72a, 72b and the discharge port reed valve (a pick-up side check valve) 70 adapted to open when the pressure in the crank compartment 2c lowers and to close when the pressure increases is provided in the vicinity where the return hoses are connected to the crank compartment 2c, air required is picked up into the crank compartment 2c when the piston 6 moves upwardly, whereas the inside pressure of the crank compartment 2c increases as the piston 6 lowers, whereby lubricating oil within the crank compartment 2c can be sent tout in a more ensured fashion.

Incidentally, in a case where there is provided no air supply path from the outside to the interior of the crank compartment 2c, only a negative pressure or a lower positive pressure is formed inside the crank compartment, this causing a concern that there occurs a case where oil cannot be sent out properly.

Furthermore, since the centrifugal lubricating oil mist separating mechanism 71 for separating lubricating oil mist is interposed at the intermediate position along the length of the return passageways 72a, 72b, so that lubricating oil mist so separated is returned to the crank compartment 2c via the return hose 72b, whereas air from which the mist content is removed is discharged to the atmosphere, only lubricating oil mist can be returned to the crank compartment, whereby the reduction in oil sending efficiency can be avoided which would occur when an excessive amount of air is allowed to flow into the crank compartment, thereby making it possible to send out lubricating oil in the crank compartment in an ensured fashion while preventing the atmospheric pollution.

In addition, since the lubricating oil pump 52 is disposed so as to be connected to the one end of the crankshaft 8 and the discharge port of the lubricating oil pump 52 is made to communicate with the crank oil supply bore (an in-crankshaft oil supply passageway) 8e formed within the crankshaft 8 via the communication bore (an in-pump oil supply passageway) 62a formed within the lubricating oil pump 52 and the connecting pipe 64, the lubricating oil can be supplied to the parts of the crankshaft 8 which need to be lubricated by the simple and compact construction.

In addition, since the crankshaft 8 and the lubricating oil pump 52 are connected together by the Oldham's coupling 67 which can absorb the displacement of the shafts in the direction normal thereto and the communication bore 62a and the crank oil supply bore 8e are made to communicate with each other via the connecting pipe 64 with the O rings 64a having elasticity being interposed between the connecting pipe 64 and the communicating bore 62a, the crank oil supply bore 8e, even in the event that the centers of the crankshaft 8 and the pump shaft 62 are caused to deviate slightly from each other, lubricating oil can be supplied to the parts needing to be lubricated without any problem, thereby making it possible to secure the required lubricating properties.

Furthermore, since the tubular boss portion 60c is formed in the vicinity of the main shaft 14 and the drive shaft 15 which constitute the transmission, the crankcase connecting case bolt 60 is inserted into the bolt bore 60a in the boss portion 60c so that the space between the inner circumferential surface of the bolt bore 60a and the outer circumferential surface of the case bolt 60 is made to form the lubricating oil passageway, and the branch bore (the lubricating oil supply bore) 60b is formed which is directed to the change-speed gears at the boss portion 60c, lubricating oil can be supplied to the meshing surfaces of the change-speed gears while obviating the necessity of providing an exclusive lubricating oil supply passageway.

In addition, since the other end of the lubricating oil passageway defined by the inner circumferential surface of the bolt bore 60c and the outer circumferential surface of the case bolt 60 is made to communicate with an opening of the drive shaft bore (the lubricating oil passageway) 15a formed within the drive shaft 15 which is situated opposite to an outlet side of the bore, lubricating oil can be supplied to the portions on the drive shaft 15 which are brought into sliding contact with the change-speed gears while obviating the necessity of providing an exclusive lubricating oil supply passageway.

INDUSTRIAL APPLICABILITY

According to the first aspect of the invention, since the iron alloy bearing member which is insert case in the aluminum alloy crankcase is made to be the integral part made up of the bearing portion which surrounds the circumference of the journal portion of the crankshaft and the connecting boss portions which extend toward the cylinder body, so that the cylinder body connecting bolts are screwed into the connecting boss portions, respectively, the connecting rigidity between the cylinder body and the crankcase can be improved, and the load generated due to combustion pressure can uniformly be transmitted to the cylinder body side via the two front and rear connecting boss portions which are situated opposite across the cylinder axis.

In addition, since the bearing portion surrounds the circumference of the journal portion of the crankshaft, the strength of the bearing portion can be secured to a great extent, and the problem can be avoided that the cap bolt constitutes a limitation on the bearing supporting strength as is seen in the construction, for example, in which the semi-circular bearing portion and the semi-circular cap member are connected together with the cap bolts.

In addition, according to the first and eight aspects of the invention, since the bearing collar is provided, the crankcase can be assembled in the crankcase with the gear unit being attached thereto.

According to the second aspect of the invention, since the connecting bolts for connecting the case side flange portion integrally formed on the cylinder body to the connecting boss portions are disposed so as to overlap the crankshaft bearings as viewed in the direction of the cylinder bore axis, there is no risk that the connecting bolts and the bearing portion are caused to deviate from each other in the direction in which the crankshaft extends, thereby making it possible to transmit the load generated due to combustion pressure to the cylinder body side with better efficiency.

According to the third aspect of the invention, since the boss portions are provided which are disposed so as to overlap the cylinder axis as viewed in the direction in which the crankshaft extends, there is no risk that the connecting bolts and the bearing portion are caused to deviate from each other in the direction normal to the crankshaft, thereby making it possible to transmit the load to the cylinder body side with better efficiency.

According to the fourth, ninth and tenth aspects of the invention, since the balance shafts are disposed in parallel with the crankshaft in the vicinity thereof, and the balance shafts are supported by the iron alloy bearing members, the supporting rigidity of the balance shafts can be improved.

According to the fifth aspect of the invention, since the crankcase is of the left and right divided type which is made up of the left and right case portions and the bearing members are embedded in the side walls of the left and right case portions so that the journal portions of the crankshaft are rotationally supported by the left and right bearing members, the assembling work of the crankshaft can be facilitated to thereby improve the assembling properties while the bearing member is allowed to be constructed so as to have the bearing portion which surrounds the circumference of the journal portion.

According to the sixth aspect of the invention, since the balance shafts are made to double as the connecting bolts for connecting the left and right crankcase portions together, the flange portion which abuts with the outer surface of the bearing member is formed at the one end portion of the balance shaft, whereas the threaded portion on which the nut member is to be screwed is formed at the other end portion thereof, in causing the balance shafts to double as the case connecting bolts, the portion where the bearing member exists and hence which has the high strength is tightened, and the problem of crankcase deformation can be avoided which would result when an aluminum alloy crankcase is fastened by connecting bolts, thereby making it possible to secure the required connecting rigidity between the left and right case portions.

According to the seventh aspect of the invention, since the cylinder body side end face of the connecting boss portions is embedded inwardly without being exposed to the cylinder body side mating surface of the crankcase, the reduction in sealing capability can be avoided which would be generated due to, for example, the difference in thermal expansion coefficients which would occur at the joint between the crankcase and the cylinder body when different types of metals are exposed thereto.

The invention claimed is:

1. An engine fastening structure comprising:
    a cylinder body;
    an aluminum alloy crankcase;
    a crankshaft disposed in the crankcase;
    a bearing bracket made from iron alloy;
    a bearing portion surrounding a journal portion of the crankshaft;
    a bearing collar that is fit into the bearing bracket, is formed as a separate unit from the bearing portion, and holds the bearing portion,
    wherein the bearing bracket comprises a plurality of connecting boss portions extending toward the cylinder body from the bearing portion, the plurality of connecting boss portions being situated on opposite sides of a cylinder axis as viewed in a direction in which the crankshaft extends, and
    connecting bolts screwed into the connecting boss portions to connect the cylinder body to the crankcase.

2. An engine fastening structure as set forth in claim 1, further comprising:
    a case side flange portion integrally formed on the cylinder body and connected to the crankcase with the connecting bolts,
    wherein the connecting bolts overlap the bearing portion as viewed in a direction in which the cylinder bore axis extends.

3. An engine fastening structure as set forth in claim 1 or 2, wherein the connecting boss portions overlap the cylinder bore axis as viewed in a direction in which the crankshaft extends.

4. An engine fastening structure as set forth in claim 3, further comprising:
a balance shaft disposed in a vicinity of and in parallel with the crankshaft, wherein the balance shaft is supported by the iron alloy bearing bracket.

5. An engine fastening structure as set forth in claim 4, wherein:
the crankcase is divided into left and right case portions in a direction in which the crankshaft extends, and
the bearing bracket is embedded in a side wall of each of the left and right case portions and supports left and right journal portions of the crankshaft.

6. An engine fastening structure as set forth in claim 5, wherein:
the balance shaft rotationally supports a balancer weight and is also a connecting bolt connecting the left and right crankcase portions together, and
a flange portion abutting an outer surface of the bearing bracket is formed at one end portion of the balance shaft, and a threaded portion on which a nut member is screwed is formed at an other end portion of the balance shaft.

7. An engine fastening structure as set forth in claim 6, wherein a cylinder body side end face of the connecting boss portion is positioned inwardly without being exposed to a cylinder body side mating surface of the crankcase.

8. An engine fastening structure as set forth in claim 1, wherein a gear is provided on the crankshaft closer to a shaft end side than the bearing portion, and an outside diameter of the bearing collar is larger than an outside diameter of the gear.

9. An engine fastening structure as set forth in claim 4, wherein the bearing bracket comprises left and right bearing brackets, and the balance shaft is suspended by the left and right bearing brackets.

10. An engine fastening structure as set forth in claim 9, wherein the balance shaft is situated between the crankshaft and the connecting boss portions as viewed in a direction normal to a plane containing the cylinder bore axis and a crankshaft axis.

* * * * *